US008235286B2

(12) United States Patent
Komatsu et al.

(10) Patent No.: US 8,235,286 B2
(45) Date of Patent: Aug. 7, 2012

(54) CARD CAPABLE OF AUTHENTICATION

(75) Inventors: Nobuaki Komatsu, Tokyo (JP);
Shin-ichiro Nanjo, Tokyo (JP)

(73) Assignee: International Frontier Technology Laboratory, Inc., Tokyo (JP)

( * ) Notice: Subject to any disclaimer, the term of this patent is extended or adjusted under 35 U.S.C. 154(b) by 549 days.

(21) Appl. No.: 12/097,914

(22) PCT Filed: Dec. 19, 2006

(86) PCT No.: PCT/JP2006/325224
§ 371 (c)(1),
(2), (4) Date: Sep. 18, 2009

(87) PCT Pub. No.: WO2007/072793
PCT Pub. Date: Jun. 28, 2007

(65) Prior Publication Data
US 2010/0044431 A1 Feb. 25, 2010

(30) Foreign Application Priority Data

Dec. 19, 2005 (JP) ................................ 2005-365416
Jul. 24, 2006 (JP) ................................ 2006-200823
Oct. 23, 2006 (JP) ................................ 2006-287714

(51) Int. Cl.
*G06K 19/00* (2006.01)
(52) U.S. Cl. ......... 235/380; 235/487; 235/492; 235/382
(58) Field of Classification Search .................. 235/380, 235/487, 492, 382
See application file for complete search history.

(56) References Cited

U.S. PATENT DOCUMENTS

| 5,145,212 | A | | 9/1992 | Mallik |
| 5,228,094 | A | | 7/1993 | Villa |
| 5,506,992 | A | * | 4/1996 | Saxenmeyer .................... 712/11 |
| 5,583,333 | A | | 12/1996 | Hoshino et al. |
| 6,182,892 | B1 | * | 2/2001 | Angelo et al. ................ 235/380 |
| 6,612,494 | B1 | * | 9/2003 | Outwater ................. 235/462.04 |
| 7,284,270 | B2 | * | 10/2007 | Kitamura et al. ................ 726/20 |
| 7,526,653 | B1 | | 4/2009 | Vogel et al. |

(Continued)

FOREIGN PATENT DOCUMENTS

EP 0889448 A2 1/1999

(Continued)

OTHER PUBLICATIONS

"Handbook on the Technique to Prevent Forgery on the Surface of Affiliated IC Cards," published by the National Printing Bureau, the Ministry of Finance; Jul. 20, 2002; cited spec.

(Continued)

Primary Examiner — Allyson Trail
(74) Attorney, Agent, or Firm — Westerman, Hattori, Daniels & Adrian, LLP

(57) ABSTRACT

It is possible to prevent use of a forged card. An authentication chip describing information which cannot be copied or difficult to be copied is attached to a card and a card processing device includes a card authentication processing device. The information described in the authentication chip is digitized and encrypted to obtain encrypted data, which is described on an authentication certifying chip. The authentication certifying chip is attached to the card. The authentication certifying chip checks the validity of the authentication chip. Before a specific operation such as entry of a password is started, it is judged whether the card is true so as to exclude a forged card.

45 Claims, 30 Drawing Sheets

U.S. PATENT DOCUMENTS

| | | | |
|---|---|---|---|
| 2003/0132302 A1* | 7/2003 | Hattori | 235/492 |
| 2003/0152848 A1* | 8/2003 | Leroux et al. | 430/22 |
| 2004/0158724 A1 | 8/2004 | Carr et al. | |
| 2005/0129282 A1 | 6/2005 | O'Doherty et al. | |
| 2005/0189416 A1* | 9/2005 | Charrin | 235/440 |
| 2005/0194454 A1* | 9/2005 | Ferber et al. | 235/492 |
| 2005/0212657 A1* | 9/2005 | Simon | 340/5.74 |
| 2008/0154751 A1* | 6/2008 | Miles | 705/28 |

FOREIGN PATENT DOCUMENTS

| | | |
|---|---|---|
| EP | 1146477 A1 | 10/2001 |
| EP | 1475242 A1 | 11/2004 |
| JP | 6-32091 A | 2/1994 |
| JP | 8-194790 A | 7/1996 |
| JP | 10-6673 A | 1/1998 |
| JP | 10-16458 A | 1/1998 |
| JP | 10-44650 A | 2/1998 |
| JP | 11-259623 A | 9/1999 |
| JP | 2001-22907 A | 1/2001 |
| JP | 2001-052143 A | 2/2001 |
| JP | 2003-29636 A | 1/2003 |
| JP | 2004-171109 A | 6/2004 |
| JP | 2005-228445 A | 8/2005 |
| RU | 2263407 C2 | 9/2003 |
| WO | 01/43086 A1 | 6/2001 |
| WO | 01/78301 A1 | 10/2001 |
| WO | 02/086725 A1 | 10/2002 |
| WO | 2004/044825 A1 | 5/2004 |
| WO | 2005/020088 A1 | 9/2005 |
| WO | 2005/080088 A1 | 9/2005 |

OTHER PUBLICATIONS

"Financial Business and Artifact-Metrics," published by the Institute for Monetary and Economic Studies, the Bank of Japan; Discussion Paper No. 2004-J-12; pp. 1-21; cited spec.

International Search Report of PCT/JP2006/325224, date of mailing: Mar. 27, 2007.

Supplementary European Search Report dated Mar. 25, 2010, issued in corresponding European Patent Application No. 06834934.

"The Patterns of Artifact-Metrics in Financial Field," 6th Information Security Symposium; pp. 153-168, Jun. 2004.

"Handbook on the Technique to Prevent Forgery on the Surface of Affiliated IC Cards," published by the National Printing Bureau, the Ministry of Finance; Jul. 20, 2002.

"Financial Business and Artifact-Metrics," published by the Institute for Monetary and Economic Studies, the Bank of Japan; Discussion Paper No. 2004-J-12; pp. 1-21.

* cited by examiner

FIG. 2
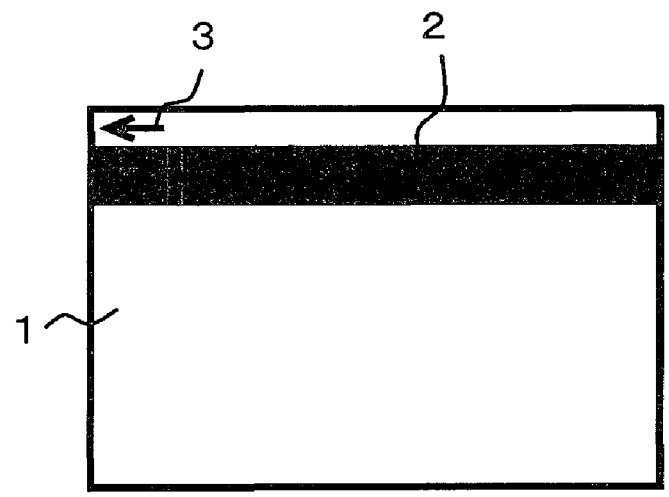
(a)
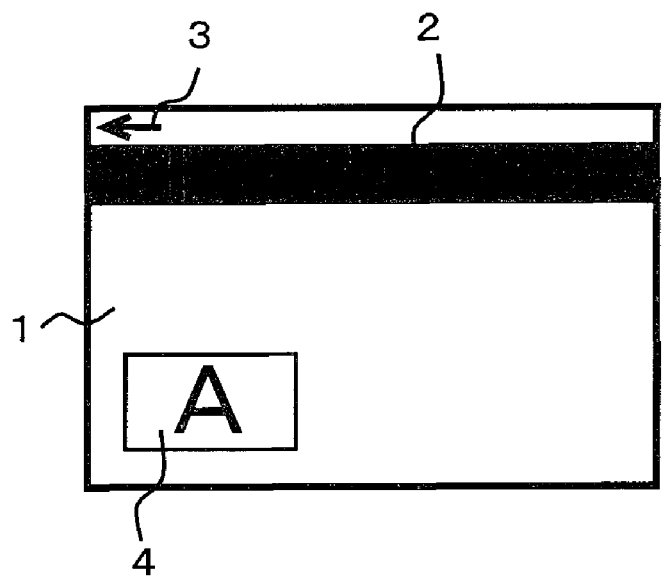
(b)

FIG. 3
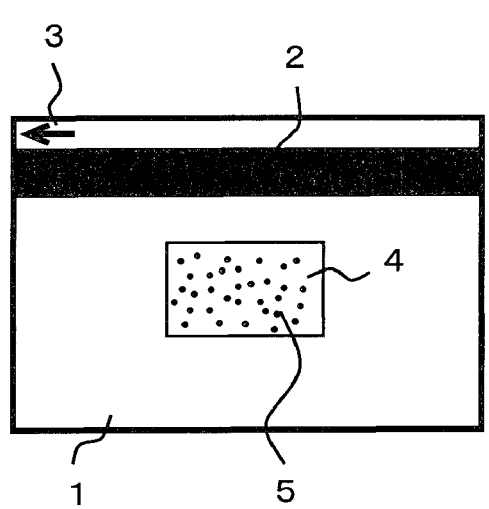
(a)
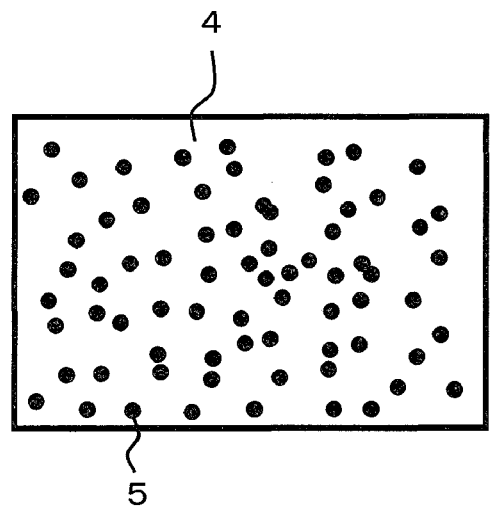
(c)
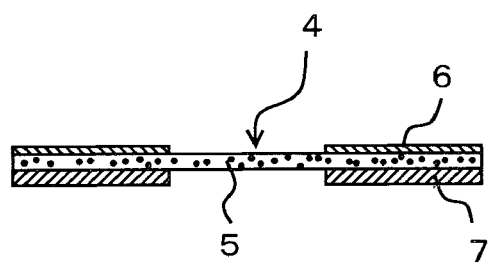
(b)

FIG. 4
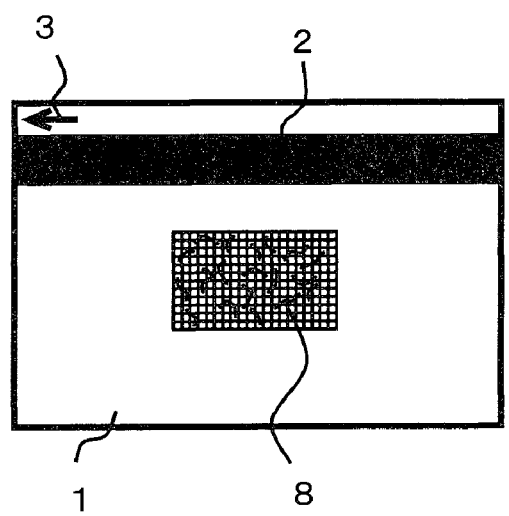
(a)
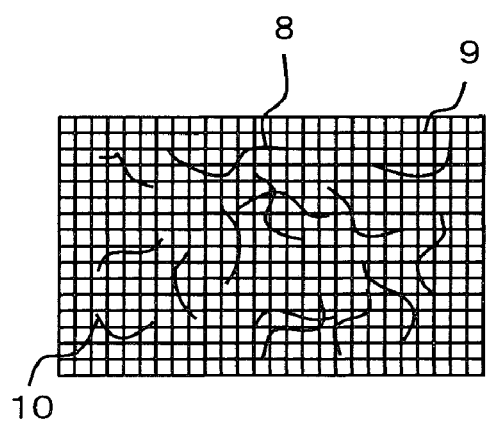
(c)
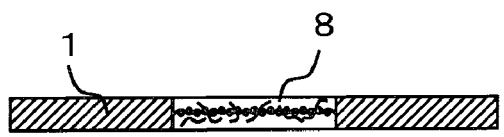
(b)
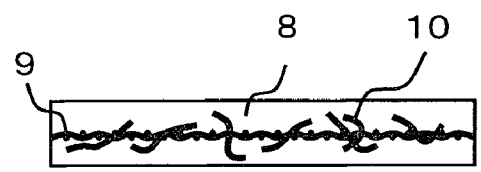
(d)

FIG. 8
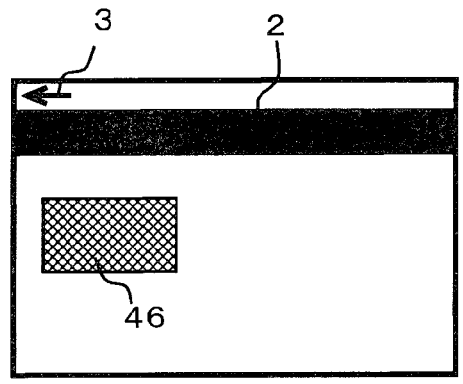
(a)
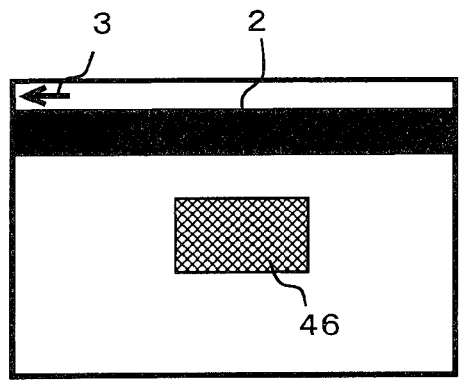
(b)
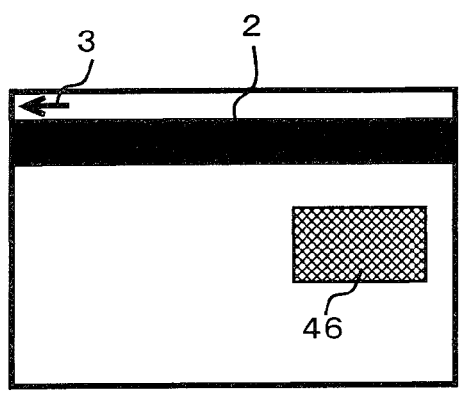
(c)
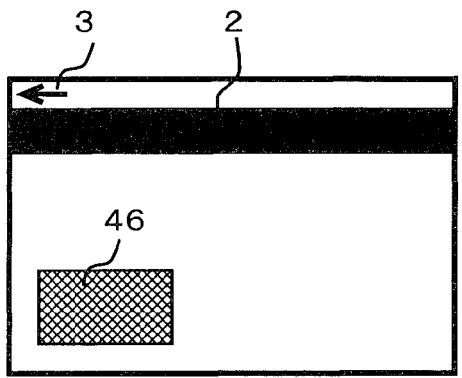
(d)
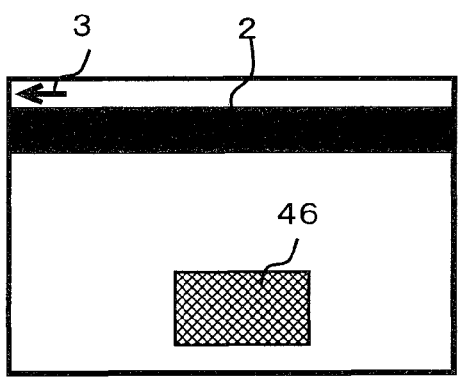
(e)
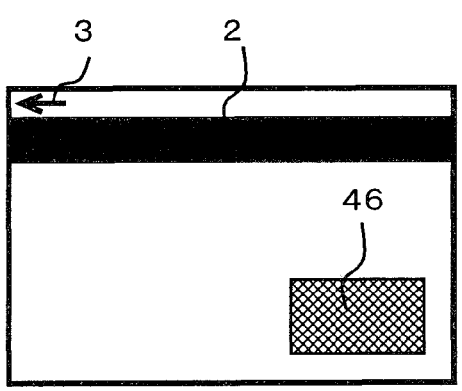
(f)

FIG.9
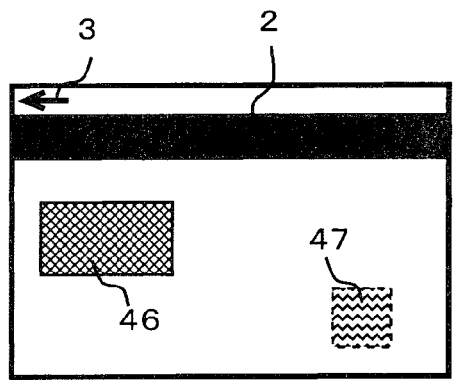
(a)
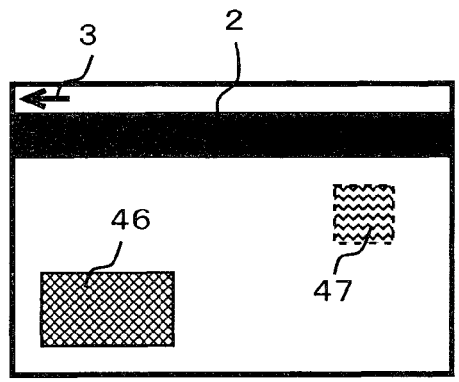
(d)
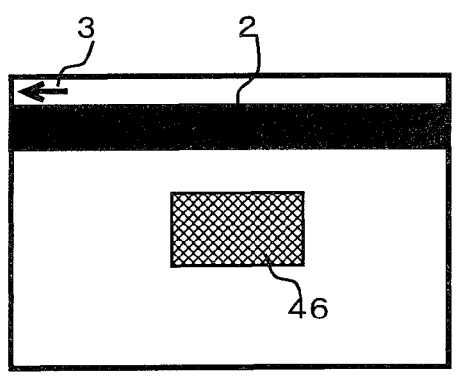
(b)
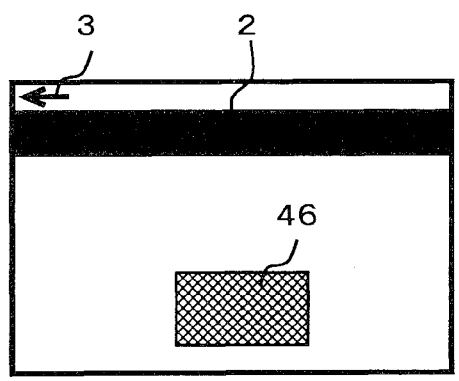
(e)
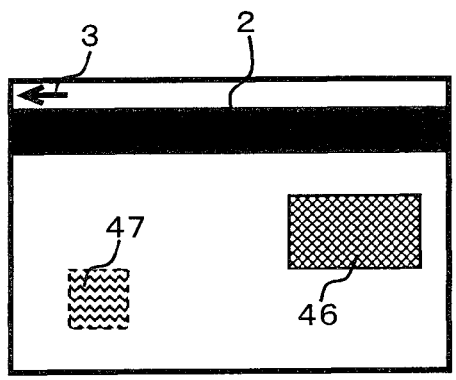
(c)
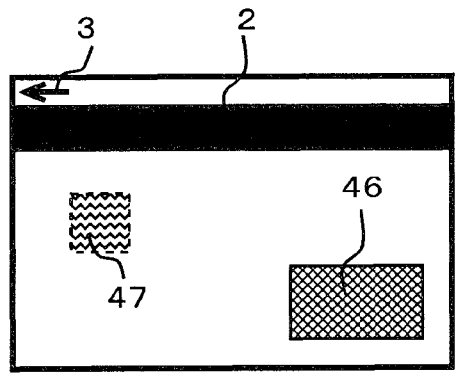
(f)

Fig. 11

|   | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
|---|---|---|---|---|---|---|---|---|---|---|---|---|---|---|---|---|---|---|---|---|---|---|---|---|---|---|---|---|---|---|---|---|
| 0 | * | * | * |   | * |   | * | * |   | * | * | * |   |   | * | * |   | * |   | * | * | * | * | * | * |   |   |   | * |   | * | * |
| 1 |   | * | * | * |   | * | * | * |   |   | * | * | * |   |   | * |   |   |   | * |   | * | * | * |   | * |   |   |   |   | * | * |
| 2 |   | * |   |   |   |   | * |   | * |   |   |   | * |   | * | * | * | * | * | * | * | * | * | * |   |   |   |   |   |   |   | * |
| 3 | * | * | * |   | * |   |   |   | * |   | * | * | * |   |   | * |   |   |   |   | * |   |   | * | * | * |   |   |   |   | * | * |
| 4 | * | * |   |   |   | * |   | * |   |   | * | * |   | * | * | * | * |   |   |   | * |   | * |   | * |   | * | * |   |   | * | * |
| 5 | * | * | * |   | * | * | * |   |   |   | * | * |   | * | * |   |   |   |   | * | * | * |   |   | * |   |   |   |   |   |   | * |
| 6 |   | * |   | * | * |   |   |   | * | * | * |   |   | * |   |   |   | * | * | * | * | * | * | * | * |   |   | * |   | * |   | * |
| 7 | * | * | * | * | * |   |   | * |   |   |   | * |   |   | * |   | * |   | * |   |   | * | * |   |   |   | * | * |   |   |   | * |
| 8 | * | * |   | * |   |   | * |   |   | * | * |   | * |   |   | * | * | * |   |   | * | * |   |   |   | * | * |   |   | * |   |   |
| 9 |   | * |   |   | * |   | * | * | * |   | * | * |   | * |   |   |   |   | * | * | * |   |   |   | * | * | * | * | * | * | * | * |
| 10 | * | * |   |   |   |   | * | * |   |   | * | * |   | * |   | * |   | * |   |   |   | * | * |   | * | * | * |   | * |   | * |   |
| 11 | * |   |   | * |   | * | * | * |   | * |   |   |   |   | * | * | * | * |   |   | * | * |   | * |   | * |   |   | * | * | * | * |
| 12 | * |   |   |   | * |   |   |   |   |   |   |   |   |   |   |   |   | * |   |   | * | * | * |   |   |   |   | * |   |   |   | * |
| 13 |   | * | * | * | * |   |   |   | * | * |   | * | * | * | * |   | * |   | * | * | * | * |   | * |   | * |   | * |   |   | * | * |
| 14 | * | * |   |   | * |   | * | * |   |   | * |   | * |   | * | * | * |   | * | * | * | * |   |   | * | * | * |   |   | * | * |   |
| 15 |   | * |   |   |   | * | * |   |   |   |   |   |   |   |   |   |   |   | * | * |   | * | * |   | * | * |   | * |   |   |   |   |
| 16 | * | * |   |   | * | * | * |   | * | * |   |   | * | * | * |   | * |   |   |   | * | * |   |   | * | * | * | * |   |   |   |   |
| 17 |   |   |   | * | * |   |   | * | * |   | * |   |   | * | * |   |   |   | * |   | * | * |   | * | * |   |   |   | * | * |   | * |
| 18 | * |   |   | * |   | * | * | * |   | * |   | * |   |   |   |   | * |   | * | * | * |   | * |   |   | * |   |   |   | * | * |   |
| 19 |   | * |   | * | * | * |   |   | * | * | * |   | * | * | * | * | * | * | * |   | * | * | * | * | * |   | * |   |   | * | * | * |
| 20 | * |   |   |   | * |   | * | * | * |   |   |   | * | * | * | * |   |   | * | * |   |   | * |   | * |   | * |   | * |   |   |   |
| 21 | * | * | * |   |   | * |   | * | * | * | * |   |   | * | * |   | * |   |   |   | * |   |   |   |   |   | * | * | * | * | * | * |
| 22 |   | * | * |   |   | * | * | * |   |   | * |   |   |   | * | * | * | * |   | * | * |   | * |   | * | * |   |   | * | * | * | * |
| 23 |   | * | * |   |   |   |   |   |   | * | * |   | * |   | * | * | * | * |   | * |   | * |   | * |   |   |   | * |   |   | * | * |
| 24 | * |   | * |   |   | * | * | * | * | * |   | * | * |   | * | * |   |   |   |   | * | * |   |   | * | * | * |   |   |   |   | * |
| 25 |   | * |   | * |   |   | * |   | * | * |   | * | * | * |   |   | * | * |   | * | * | * |   | * | * | * |   |   |   | * |   |   |
| 26 | * |   |   |   | * | * |   | * |   | * | * |   |   |   |   |   | * | * | * |   |   | * | * |   | * | * | * |   |   |   |   | * |
| 27 |   | * |   |   |   | * | * | * |   | * | * | * |   | * |   |   |   |   | * |   |   |   |   |   | * | * |   |   |   | * |   | * |
| 28 | * | * | * |   | * | * | * | * |   | * | * | * | * | * |   |   | * |   |   | * | * | * | * |   | * |   |   |   | * |   |   |   |
| 29 |   | * | * | * |   |   |   | * |   | * |   |   |   | * |   |   | * |   | * |   | * | * |   | * | * |   | * |   | * |   |   |   |
| 30 | * | * | * |   | * |   |   |   | * |   |   | * |   |   | * | * | * | * | * |   | * |   |   | * | * | * | * | * | * | * |   |   |
| 31 | * | * |   |   | * |   |   |   |   | * | * | * | * |   |   |   |   |   | * |   | * |   |   |   | * | * | * |   |   |   | * | * |

Fig. 12

EB735F8B77390BA3428BFF01E89C84E3
C563C55BEE360E4158E27F95F912A631
D268E6324BB41C7FC33546EAAE879AB7
840027093C6F5EABCB2B9E76460006DA
DD8E863C19AC26CD9750B48D5CEFEFAE
8B4798AAE5ED101F3391F6B7301AF54B
A7DB0671296E6EE486B071B943BA0835
EF7C4FA238A256D4E893E9FEC87814E3

Fig. 13

| E | B | 7 | 3 | 5 | F | 8 | B |
|---|---|---|---|---|---|---|---|
| 7 | 7 | 3 | 9 | 0 | B | A | 3 |
| 4 | 2 | 8 | B | F | F | 0 | 1 |
| E | B | 7 | 3 | 5 | F | 8 | B |
| 7 | 7 | 3 | 9 | 0 | B | A | 3 |
| 4 | 2 | 8 | B | F | F | 0 | 1 |
| E | 8 | 9 | C | 8 | 4 | E | 3 |
| C | 5 | 6 | 3 | C | 5 | 5 | B |
| E | E | 3 | 6 | 0 | E | 4 | 1 |
| 5 | 8 | E | 2 | 7 | F | 9 | 5 |
| F | 9 | 1 | 2 | A | 6 | 3 | 1 |
| D | 2 | 6 | 8 | E | 6 | 3 | 2 |
| 4 | B | B | 4 | 1 | C | 7 | F |
| C | 3 | 3 | 5 | 4 | 6 | E | A |
| A | E | 8 | 7 | 9 | A | B | 7 |
| 8 | 4 | 0 | 0 | 2 | 7 | 0 | 9 |
| 3 | C | 6 | F | 5 | E | A | B |
| C | B | 2 | B | 9 | E | 7 | 6 |
| 4 | 6 | 0 | 0 | 0 | 6 | D | A |
| D | D | 8 | E | 8 | 6 | 3 | C |
| 1 | 9 | A | C | 2 | 6 | C | D |
| 9 | 7 | 5 | 0 | B | 4 | 8 | D |
| 5 | C | E | F | E | F | A | E |
| 8 | B | 4 | 7 | 9 | 8 | A | A |
| E | 5 | E | D | 1 | 0 | 1 | F |
| 3 | 3 | 9 | 1 | F | 6 | B | 7 |
| 3 | 0 | 1 | A | F | 5 | 4 | B |
| A | 7 | D | B | 0 | 6 | 7 | 1 |
| 2 | 9 | 6 | E | 6 | E | E | 4 |
| 8 | 6 | B | 0 | 7 | 1 | B | 9 |
| 4 | 3 | B | A | 0 | 8 | 3 | 5 |
| E | F | 7 | C | 4 | F | A | 2 |
| 3 | 8 | A | 2 | 5 | 6 | D | 4 |
| E | 8 | 9 | 3 | E | 9 | F | E |
| C | 8 | 7 | 8 | 1 | 4 | E | 3 |

|    | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
|---|---|---|---|---|---|---|---|---|---|---|---|---|---|---|---|---|---|---|---|---|---|---|---|---|---|---|---|---|---|---|---|---|
| 0 | 1 | 1 | 1 | 0 | 1 | 0 | 1 | 1 | 0 | 1 | 1 | 1 | 0 | 0 | 1 | 1 | 0 | 1 | 0 | 1 | 1 | 1 | 1 | 1 | 1 | 0 | 0 | 0 | 1 | 0 | 1 | 1 |
| 1 | 0 | 1 | 1 | 1 | 0 | 1 | 1 | 1 | 0 | 0 | 1 | 1 | 1 | 0 | 0 | 1 | 0 | 0 | 0 | 0 | 1 | 0 | 1 | 1 | 1 | 0 | 1 | 0 | 0 | 0 | 1 | 1 |
| 2 | 0 | 1 | 0 | 0 | 0 | 0 | 1 | 0 | 1 | 0 | 0 | 0 | 1 | 0 | 1 | 1 | 1 | 1 | 1 | 1 | 1 | 1 | 1 | 0 | 0 | 0 | 0 | 0 | 0 | 0 | 0 | 1 |
| 3 | 1 | 1 | 1 | 0 | 1 | 0 | 0 | 0 | 1 | 0 | 0 | 1 | 1 | 1 | 0 | 0 | 1 | 0 | 0 | 0 | 0 | 1 | 0 | 0 | 1 | 1 | 1 | 0 | 0 | 0 | 1 | 1 |
| 4 | 1 | 1 | 0 | 0 | 0 | 1 | 0 | 1 | 0 | 1 | 1 | 0 | 0 | 0 | 1 | 1 | 1 | 1 | 1 | 0 | 0 | 0 | 1 | 0 | 1 | 0 | 1 | 0 | 1 | 1 | 0 | 1 | 1 |
| 5 | 1 | 1 | 1 | 0 | 1 | 1 | 1 | 0 | 0 | 0 | 1 | 1 | 0 | 1 | 1 | 0 | 0 | 0 | 0 | 0 | 1 | 1 | 1 | 0 | 0 | 1 | 0 | 0 | 0 | 0 | 0 | 1 |
| 6 | 0 | 1 | 0 | 1 | 1 | 0 | 0 | 0 | 1 | 1 | 1 | 0 | 0 | 0 | 1 | 0 | 0 | 1 | 1 | 1 | 1 | 1 | 1 | 1 | 1 | 0 | 0 | 1 | 0 | 1 | 0 | 1 |
| 7 | 1 | 1 | 1 | 1 | 1 | 0 | 0 | 1 | 0 | 0 | 0 | 1 | 0 | 0 | 1 | 0 | 1 | 0 | 1 | 0 | 0 | 1 | 1 | 0 | 0 | 0 | 0 | 1 | 1 | 0 | 0 | 0 | 1 |
| 8 | 1 | 1 | 0 | 1 | 0 | 0 | 1 | 0 | 0 | 1 | 1 | 0 | 1 | 0 | 0 | 0 | 0 | 1 | 1 | 1 | 0 | 0 | 1 | 1 | 0 | 0 | 0 | 1 | 1 | 0 | 0 | 1 | 0 |
| 9 | 0 | 1 | 0 | 0 | 1 | 0 | 1 | 1 | 1 | 0 | 1 | 1 | 0 | 1 | 0 | 0 | 0 | 0 | 1 | 1 | 1 | 1 | 0 | 0 | 0 | 0 | 1 | 1 | 1 | 1 | 1 | 1 | 1 |
| 10 | 1 | 1 | 0 | 0 | 0 | 0 | 1 | 1 | 0 | 0 | 1 | 1 | 0 | 1 | 0 | 1 | 0 | 1 | 0 | 0 | 0 | 1 | 1 | 0 | 1 | 1 | 1 | 1 | 0 | 1 | 0 | 1 | 0 |
| 11 | 1 | 0 | 1 | 0 | 1 | 1 | 1 | 0 | 1 | 0 | 0 | 0 | 0 | 1 | 1 | 1 | 1 | 0 | 0 | 1 | 1 | 0 | 1 | 0 | 1 | 0 | 1 | 1 | 0 | 1 | 1 | 1 |
| 12 | 1 | 0 | 0 | 0 | 0 | 1 | 0 | 0 | 0 | 0 | 0 | 0 | 0 | 0 | 0 | 0 | 0 | 1 | 0 | 0 | 1 | 1 | 1 | 0 | 0 | 0 | 0 | 1 | 0 | 0 | 1 |
| 13 | 0 | 0 | 1 | 1 | 1 | 1 | 1 | 0 | 0 | 0 | 1 | 1 | 0 | 1 | 1 | 1 | 1 | 0 | 1 | 0 | 1 | 1 | 1 | 1 | 0 | 1 | 0 | 1 | 0 | 1 | 0 | 1 | 1 |
| 14 | 1 | 1 | 0 | 0 | 1 | 0 | 1 | 1 | 0 | 0 | 1 | 0 | 1 | 0 | 1 | 1 | 1 | 0 | 0 | 1 | 1 | 1 | 1 | 0 | 0 | 1 | 1 | 1 | 0 | 1 | 1 | 0 |
| 15 | 0 | 1 | 0 | 0 | 0 | 1 | 1 | 0 | 0 | 0 | 0 | 0 | 0 | 0 | 0 | 0 | 0 | 0 | 1 | 1 | 0 | 1 | 1 | 0 | 1 | 1 | 0 | 1 | 1 | 0 | 1 | 0 |
| 16 | 1 | 1 | 0 | 1 | 1 | 1 | 0 | 1 | 1 | 0 | 0 | 0 | 1 | 1 | 1 | 0 | 1 | 0 | 0 | 0 | 0 | 1 | 1 | 0 | 0 | 0 | 1 | 1 | 1 | 1 | 0 | 0 |
| 17 | 0 | 0 | 0 | 1 | 1 | 0 | 0 | 1 | 1 | 0 | 1 | 0 | 1 | 1 | 0 | 0 | 0 | 0 | 1 | 0 | 0 | 1 | 1 | 0 | 1 | 1 | 0 | 0 | 1 | 1 | 0 | 1 |
| 18 | 1 | 0 | 0 | 1 | 0 | 1 | 1 | 1 | 0 | 1 | 0 | 1 | 0 | 0 | 0 | 0 | 1 | 0 | 1 | 1 | 0 | 1 | 0 | 0 | 1 | 0 | 0 | 0 | 1 | 1 | 0 | 1 |
| 19 | 0 | 1 | 0 | 1 | 1 | 1 | 0 | 0 | 1 | 1 | 1 | 0 | 1 | 1 | 1 | 1 | 1 | 1 | 1 | 0 | 1 | 1 | 1 | 1 | 1 | 0 | 1 | 0 | 1 | 1 | 1 | 0 |
| 20 | 1 | 0 | 0 | 0 | 1 | 0 | 1 | 1 | 0 | 1 | 0 | 0 | 0 | 1 | 1 | 1 | 1 | 0 | 0 | 1 | 1 | 0 | 0 | 0 | 1 | 0 | 1 | 0 | 1 | 0 | 1 | 0 |
| 21 | 1 | 1 | 1 | 0 | 0 | 1 | 0 | 1 | 1 | 1 | 1 | 0 | 1 | 1 | 0 | 1 | 0 | 0 | 0 | 1 | 0 | 0 | 0 | 0 | 0 | 0 | 0 | 1 | 1 | 1 | 1 | 1 |
| 22 | 0 | 0 | 1 | 1 | 0 | 0 | 1 | 1 | 1 | 0 | 0 | 1 | 0 | 0 | 0 | 1 | 1 | 1 | 1 | 1 | 0 | 1 | 1 | 0 | 1 | 0 | 1 | 1 | 0 | 1 | 1 | 1 |
| 23 | 0 | 0 | 1 | 1 | 0 | 0 | 0 | 0 | 0 | 0 | 1 | 1 | 0 | 1 | 0 | 1 | 1 | 1 | 1 | 0 | 1 | 0 | 1 | 0 | 1 | 0 | 0 | 1 | 0 | 1 | 1 |
| 24 | 1 | 0 | 1 | 0 | 0 | 1 | 1 | 1 | 1 | 1 | 0 | 1 | 1 | 0 | 1 | 1 | 0 | 0 | 0 | 0 | 1 | 1 | 0 | 0 | 1 | 1 | 1 | 1 | 0 | 0 | 0 | 1 |
| 25 | 0 | 0 | 1 | 0 | 1 | 0 | 0 | 1 | 0 | 1 | 1 | 0 | 1 | 1 | 1 | 0 | 0 | 1 | 1 | 0 | 1 | 1 | 1 | 0 | 1 | 1 | 1 | 0 | 0 | 1 | 0 | 0 |
| 26 | 1 | 0 | 0 | 0 | 0 | 1 | 1 | 0 | 1 | 0 | 1 | 1 | 0 | 0 | 0 | 0 | 1 | 1 | 1 | 0 | 0 | 0 | 1 | 1 | 0 | 1 | 1 | 1 | 1 | 0 | 0 | 1 |
| 27 | 0 | 1 | 0 | 0 | 0 | 0 | 1 | 1 | 1 | 0 | 1 | 1 | 1 | 0 | 1 | 0 | 0 | 0 | 0 | 0 | 1 | 0 | 0 | 0 | 0 | 0 | 1 | 1 | 0 | 1 | 0 | 1 |
| 28 | 1 | 1 | 1 | 0 | 1 | 1 | 1 | 1 | 0 | 1 | 1 | 1 | 1 | 1 | 0 | 0 | 0 | 1 | 0 | 0 | 1 | 1 | 1 | 1 | 1 | 0 | 1 | 0 | 0 | 0 | 1 | 0 |
| 29 | 0 | 0 | 1 | 1 | 1 | 0 | 0 | 0 | 1 | 0 | 1 | 0 | 0 | 0 | 1 | 0 | 0 | 1 | 0 | 1 | 0 | 1 | 1 | 0 | 1 | 1 | 0 | 1 | 0 | 1 | 0 | 0 |
| 30 | 1 | 1 | 1 | 0 | 1 | 0 | 0 | 0 | 1 | 0 | 0 | 1 | 0 | 0 | 1 | 1 | 1 | 1 | 0 | 1 | 0 | 0 | 1 | 1 | 1 | 1 | 1 | 1 | 1 | 1 | 1 | 0 |
| 31 | 1 | 1 | 1 | 0 | 0 | 1 | 0 | 0 | 0 | 0 | 1 | 1 | 1 | 1 | 0 | 0 | 0 | 0 | 0 | 0 | 1 | 0 | 1 | 0 | 0 | 1 | 1 | 1 | 0 | 0 | 0 | 1 | 1 |

Fig. 16

HEXADECIMAL RANDOM MUMBERS GROUP b
    7EDD7E7E7CD7DFD91AA59CD33ED11718
    A982D1571419199DE37A9BC2C4D88D02
    CB206356D9A624F85403C8525A822CB0
    2590C020CBF7BBDF02112B9966B7CBF8
    DCADB34B1D912D304FEE9F3D7FF8D7EC
    5B5A505293EC1732E0B1845AE55B5720
    55BCEA8129C1E5D043AE3A31076C8E1A
    9EB0063 1285353D708F9C2C0FFEDCF7E

HEXADECIMAL RANDOM MUMBERS GROUP a
    EB735F8B7390BA3428BFF01E89C84E3
    C563C55BEE360E4158E27F95F912A631
    D268E6324BB41C7FC33546EAAE879AB7
    840027093C6F5EABCB2B9E76460006DA
    DD8E863C19AC26CD9750B48D5CEFEFAE
    8B4798AAE5ED101F3391F6B7301AF54B
    A7DB0671296E6EE486B071B943BA0835
    EF7C4FA238A256D4E893E9FEC87814E3

Fig. 17

BINARY RANDOM MUMBERS GROUP b 01, 11, 11, 10, 11, 01, 11, 01, 01, 11, 11, 10, 01, 11, 11, 10,
01, 11, 11, 00, 11, 01, 01, 11, 11, 01, 11, 11, 11, 01, 10, 01,
00, 01, 10, 10, 10, 10, 01, 01, 10, 01, 11, 00, 11, 01, 00, 11,
00, 11, 11, 10, 11, 01, 00, 01, 00, 01, 01, 11, 00, 01, 10, 00,
10, 10, 10, 01, 10, 00, 00, 10, 11, 01, 00, 01, 01, 01, 01, 11,
00, 01, 01, 00, 00, 01, 10, 01, 00, 01, 10, 01, 10, 01, 11, 01,
11, 10, 00, 11, 01, 11, 10, 10, 10, 01, 10, 11, 11, 00, 00, 10,
11, 00, 01, 00, 11, 01, 10, 00, 10, 00, 11, 00, 00, 00, 00, 10,
11, 00, 10, 11, 00, 10, 00, 00, 01, 10, 00, 11, 01, 01, 01, 10,
11, 01, 10, 01, 10, 10, 01, 10, 00, 10, 01, 00, 11, 11, 10, 00,
01, 01, 01, 00, 00, 00, 00, 11, 11, 00, 10, 00, 01, 01, 00, 10,
01, 01, 10, 10, 10, 00, 00, 10, 00, 10, 11, 00, 10, 11, 00, 00,
00, 10, 01, 01, 10, 01, 00, 11, 00, 00, 00, 00, 10, 00, 00,
11, 00, 10, 11, 11, 11, 01, 11, 10, 11, 10, 11, 11, 01, 11, 11,
00, 00, 00, 10, 00, 01, 00, 01, 00, 10, 10, 11, 10, 01, 10, 01,
01, 10, 01, 10, 10, 11, 01, 11, 11, 00, 10, 11, 11, 11, 10, 00,
11, 01, 11, 00, 10, 10, 11, 01, 10, 11, 00, 11, 01, 00, 10, 11,
00, 01, 11, 01, 10, 01, 00, 01, 00, 10, 11, 01, 00, 11, 00, 00,
01, 00, 11, 11, 11, 10, 11, 10, 10, 01, 11, 11, 00, 11, 11, 01,
01, 11, 11, 11, 11, 11, 10, 00, 11, 01, 01, 11, 11, 10, 11, 00,
01, 01, 10, 11, 01, 01, 10, 10, 01, 01, 00, 00, 01, 01, 00, 10,
10, 01, 00, 11, 11, 10, 11, 00, 00, 01, 01, 11, 00, 11, 00, 10,
11, 10, 00, 00, 10, 11, 00, 01, 10, 00, 01, 00, 01, 01, 10, 10,
11, 10, 01, 01, 01, 01, 10, 11, 01, 01, 01, 11, 00, 10, 00, 00,
01, 01, 01, 01, 10, 11, 11, 00, 11, 10, 10, 10, 10, 00, 00, 01,
00, 10, 10, 01, 11, 00, 00, 01, 11, 10, 01, 01, 11, 01, 00, 00,
01, 00, 00, 11, 10, 10, 11, 10, 00, 11, 10, 10, 00, 11, 00, 01,
00, 00, 01, 11, 01, 10, 11, 00, 10, 00, 11, 10, 00, 01, 10, 10,
10, 01, 11, 10, 10, 11, 00, 00, 00, 00, 01, 10, 00, 11, 00, 01,
00, 10, 10, 00, 01, 01, 00, 11, 01, 01, 00, 11, 11, 01, 01, 11,
00, 00, 10, 00, 11, 11, 10, 01, 11, 00, 00, 10, 11, 00, 00, 00,
11, 11, 11, 11, 11, 10, 11, 01, 11, 00, 11, 11, 01, 11, 11, 10,

BINARY RANDOM MUMBERS GROUP a 11, 10, 10, 11, 01, 11, 00, 11, 01, 01, 11, 11, 10, 00, 10, 11,
01, 11, 01, 11, 00, 11, 10, 01, 00, 00, 10, 11, 10, 10, 00, 11,
01, 00, 00, 10, 10, 00, 10, 11, 11, 11, 11, 11, 00, 00, 00, 01,
11, 10, 10, 00, 10, 01, 11, 00, 10, 00, 01, 00, 11, 10, 00, 11,
11, 00, 01, 01, 01, 10, 00, 11, 11, 00, 01, 01, 01, 01, 10, 11,
11, 10, 11, 10, 00, 11, 01, 11, 10, 00, 00, 11, 10, 01, 00, 00, 01,
01, 01, 10, 00, 11, 10, 00, 10, 01, 11, 11, 11, 10, 01, 01, 01,
11, 11, 10, 01, 00, 01, 00, 10, 10, 01, 10, 00, 11, 00, 01,
11, 01, 00, 10, 01, 10, 10, 00, 11, 10, 01, 10, 00, 11, 00, 10,
01, 00, 10, 11, 10, 11, 01, 00, 00, 01, 11, 00, 01, 11, 11, 11,
11, 00, 00, 11, 10, 11, 01, 01, 01, 00, 01, 10, 11, 10, 10, 10,
10, 10, 11, 10, 10, 00, 01, 11, 10, 01, 10, 10, 10, 11, 01, 11,
10, 00, 01, 00, 00, 00, 00, 00, 10, 01, 11, 00, 00, 10, 01,
00, 11, 11, 00, 01, 10, 11, 11, 01, 01, 11, 10, 10, 10, 10, 11,
11, 00, 10, 11, 00, 10, 10, 11, 10, 01, 11, 10, 01, 11, 01, 10,
01, 00, 01, 10, 00, 00, 00, 00, 00, 01, 10, 11, 01, 10, 10,
11, 01, 11, 01, 10, 00, 11, 10, 10, 00, 01, 10, 00, 11, 11, 00,
00, 01, 10, 01, 10, 10, 11, 00, 00, 10, 01, 10, 11, 00, 11, 01,
10, 01, 01, 11, 01, 01, 00, 00, 10, 11, 01, 00, 10, 00, 11, 01,
01, 01, 11, 00, 11, 10, 11, 11, 11, 10, 11, 11, 10, 10, 11, 10,
10, 00, 10, 11, 01, 00, 01, 11, 10, 01, 10, 00, 10, 10, 10, 10,
11, 10, 01, 01, 11, 10, 11, 01, 00, 01, 00, 00, 00, 01, 11, 11,
00, 11, 00, 11, 10, 01, 00, 01, 11, 11, 01, 10, 10, 11, 01, 11,
00, 11, 00, 00, 00, 01, 10, 10, 11, 11, 01, 01, 01, 00, 10, 11,
10, 10, 01, 11, 11, 01, 10, 11, 00, 00, 01, 10, 01, 11, 00, 01,
00, 10, 10, 01, 01, 10, 11, 10, 01, 10, 11, 10, 11, 10, 01, 00,
10, 00, 01, 10, 10, 11, 00, 00, 01, 11, 00, 01, 10, 11, 10, 01,
01, 00, 00, 11, 10, 11, 10, 10, 00, 00, 10, 00, 00, 11, 01, 01,
11, 10, 11, 11, 01, 11, 11, 00, 01, 00, 11, 11, 10, 10, 00, 10,
00, 11, 10, 00, 10, 10, 00, 10, 01, 01, 01, 10, 11, 01, 01, 00,
11, 10, 10, 00, 10, 01, 00, 11, 10, 10, 01, 11, 11, 11, 11, 10,
11, 00, 10, 00, 01, 11, 10, 00, 00, 01, 01, 00, 11, 10, 00, 11,

Fig. 18

QUATERNARY RANDOM MUMBERS GROUP b

QUATERNARY RANDOM MUMBERS GROUP a

Fig. 19

|   | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
|---|---|---|---|---|---|---|---|---|---|---|---|---|---|---|---|---|---|---|---|---|---|---|---|---|---|---|---|---|---|---|---|---|
| 0 | R | B | B | G | B | R | B | R | R | B | B | G | R | B | B | G | R | B | B | 0 | B | R | R | B | B | R | B | B | B | R | G | R |
| 1 | 0 | R | G | G | G | G | R | R | G | R | B | 0 | B | R | 0 | B | 0 | B | B | G | B | R | 0 | R | 0 | R | R | B | 0 | R | G | 0 |
| 2 | G | G | G | R | G | 0 | 0 | G | B | R | 0 | R | R | R | R | B | 0 | R | R | 0 | 0 | R | G | R | 0 | R | G | R | G | R | B | R |
| 3 | B | G | 0 | B | R | B | G | G | G | R | G | B | B | 0 | 0 | G | B | 0 | R | 0 | B | R | G | 0 | G | 0 | B | R | 0 | 0 | 0 | G |
| 4 | B | 0 | G | B | 0 | G | 0 | 0 | R | G | 0 | B | R | R | R | G | B | R | G | R | G | G | R | G | 0 | G | R | 0 | B | B | G | 0 |
| 5 | R | R | R | 0 | 0 | 0 | 0 | B | B | 0 | G | 0 | R | R | 0 | G | R | R | G | G | G | 0 | 0 | G | 0 | G | B | 0 | G | B | 0 | 0 |
| 6 | 0 | G | R | R | G | R | 0 | 0 | B | 0 | 0 | 0 | 0 | G | 0 | 0 | B | 0 | G | B | B | B | R | B | G | B | G | B | B | R | B | B |
| 7 | 0 | 0 | 0 | G | 0 | R | 0 | R | 0 | G | G | B | G | R | G | R | R | G | R | G | G | B | R | B | B | 0 | G | B | B | B | G | 0 |
| 8 | B | R | B | 0 | G | G | B | R | G | B | 0 | B | R | 0 | G | B | 0 | R | B | R | G | R | 0 | R | 0 | G | B | R | 0 | B | 0 | 0 |
| 9 | R | 0 | B | B | B | G | B | G | G | R | B | B | 0 | B | B | R | R | B | B | B | B | B | G | 0 | B | R | R | B | B | G | B | 0 |
| 10 | R | R | G | B | R | R | G | G | R | R | 0 | 0 | R | R | 0 | G | G | R | 0 | B | B | G | B | 0 | 0 | R | R | B | 0 | B | 0 | G |
| 11 | B | G | 0 | 0 | G | B | 0 | R | G | 0 | R | 0 | R | R | G | G | B | G | R | R | R | R | G | B | R | R | R | B | 0 | G | 0 | 0 |
| 12 | R | R | R | G | B | B | 0 | B | G | G | G | G | 0 | 0 | R | 0 | G | G | R | B | 0 | 0 | R | B | G | R | R | B | R | 0 | 0 |   |
| 13 | R | 0 | 0 | B | G | G | B | G | 0 | B | G | G | 0 | B | 0 | R | 0 | 0 | R | B | R | G | B | 0 | G | 0 | B | G | 0 | R | G | G |
| 14 | G | R | B | G | G | B | 0 | 0 | 0 | 0 | R | G | 0 | B | R | 0 | G | G | 0 | R | R | 0 | B | R | R | 0 | B | B | R | R | B |   |
| 15 | 0 | 0 | G | 0 | B | B | G | R | B | 0 | 0 | G | B | 0 | 0 | 0 | B | B | B | B | G | B | R | B | 0 | B | B | R | B | B | G |   |
| 16 | B | G | G | B | R | B | 0 | B | R | R | B | B | G | 0 | G | B | R | B | R | B | 0 | B | G | R | 0 | 0 | G | B | G | G | 0 | B |
| 17 | R | 0 | 0 | G | G | 0 | G | B | B | B | B | B | 0 | 0 | 0 | R | B | G | G | 0 | G | R | B | 0 | G | 0 | R | 0 | B | G | 0 | B |
| 18 | B | 0 | R | R | R | G | 0 | B | B | 0 | R | R | R | G | B | B | G | B | G | 0 | B | R | G | 0 | 0 | B | G | R | 0 | 0 | R |   |
| 19 | R | R | G | 0 | B | G | 0 | G | R | B | B | B | G | R | R | R | B | B | G | R | 0 | R | 0 | G | G | G | R | G | 0 | B | 0 | R |
| 20 | B | R | 0 | G | R | G | G | 0 | B | G | R | G | 0 | B | 0 | G | R | 0 | G | B | G | B | R | 0 | 0 | R | B | 0 | R | B | B | B |
| 21 | B | 0 | 0 | B | 0 | B | R | R | R | 0 | R | G | B | G | G | G | G | G | B | G | G | 0 | R | B | G | R | G | G | G | B | R | B |
| 22 | G | 0 | R | 0 | 0 | 0 | 0 | 0 | 0 | G | R | B | 0 | 0 | G | R | 0 | B | B | 0 | R | G | B | B | R | R | B | G | G | G | G | B |
| 23 | B | 0 | G | B | 0 | G | G | B | G | R | B | G | R | B | R | G | R | 0 | R | G | 0 | 0 | 0 | 0 | 0 | 0 | R | G | B | R | G | G |
| 24 | B | R | B | R | G | 0 | B | G | G | 0 | R | G | 0 | B | B | 0 | 0 | R | G | R | G | G | B | 0 | 0 | G | R | G | B | 0 | B | R |
| 25 | G | R | R | B | R | R | 0 | 0 | G | B | R | 0 | G | 0 | B | R | R | B | 0 | B | G | B | B | B | G | B | B | G | G | B | G |   |
| 26 | G | 0 | G | B | R | 0 | R | B | G | R | G | 0 | G | G | G | B | G | R | B | G | B | R | 0 | R | 0 | 0 | 0 | R | B | B |   |   |
| 27 | 0 | B | 0 | B | G | R | 0 | R | B | B | R | G | G | B | R | B | 0 | B | 0 | 0 | 0 | R | G | G | B | B | R | R | R | 0 | G | B |
| 28 | G | G | R | B | B | R | G | B | 0 | 0 | R | G | R | B | 0 | R | 0 | G | G | R | R | G | B | G | R | G | B | G | B | G | R | 0 |
| 29 | G | 0 | R | G | G | B | 0 | 0 | R | B | 0 | R | G | B | G | R | R | 0 | 0 | B | G | B | G | G | 0 | 0 | G | 0 | 0 | B | R | R |
| 30 | B | G | B | B | R | B | B | 0 | R | 0 | B | B | G | G | 0 | G | 0 | B | G | 0 | G | G | 0 | G | R | R | R | G | B | R | R | 0 |
| 31 | B | G | G | 0 | G | R | 0 | B | B | G | G | R | B | B | B | G | B | 0 | G | 0 | R | B | G | 0 | 0 | R | R | 0 | B | G | 0 | B |

Fig. 20

CARD CAPABLE OF AUTHENTICATION

FIELD OF THE INVENTION

The present invention relates to a structure of an object such as a card, a bank note, securities, etc., which is often forged or counterfeited and which requires authentication to check whether it is authentic or not. The invention also relates to a method for identifying authenticity of such the object.

BACKGROUND ART

In the present-day society, which is often called a card-oriented society, a great number of different types of cards are widely propagated. Specifically, a cash card and a credit card issued by a credit company which are relating to the assets of property owners and a prepaid card as securities, and identification cards such as a driver's license, a health insurance card and a passport are widely used.

In many of the cards relating to property or securities and bonds, necessary information is written on a magnetic stripe disposed on the surface or on the rear surface of the card. By using automatic machines such as an ATM (automated teller machine) or a manual reading device, the magnetic information is read from the magnetic stripe, and various types of processing are executed.

FIG. 1 shows an example of a flow of processing the cash card currently in use. (1) When an owner of a card inserts the cash card into a card slot of a terminal device such as an ATM, a sensor at the card slot senses the inserted card, and the card is taken into the device.

(2) When the card is taken into the device, the terminal device reads card information from a magnetic recording portion of the card. In case of a cash card, the card information such as a bank code, a bank branch code, a type of account, an account number, etc. is read. A card identification number, the expiration date, a type of account and an account number are recorded as the card information on the magnetic recording portion of a credit card. If a personal identification number is recorded on a cash card or a credit card, the personal identification number is also read.

(3) The terminal device judges whether or not the inserted card is a valid card, which can be handled by the terminal device.

(4) If it is not confirmed that the card can be handled by the device from the card information thus read, or if the information on the card cannot be read because the card is broken or stained even though the card is a valid card, the terminal device judges that it is an invalid card which cannot be handled and discharges the card.

(5) When the card is a valid card and when the information on the magnetic recording portion of the card has been read correctly, communication with a host computer starts.

(6) The host computer requests the inputting of the personal identification number.

(7) In response to the request from the host computer, the card user inputs the personal identification number.

(8) When the card user inputs the personal identification number in response to the request of the host computer, the host computer compares the inputted personal identification number with the personal identification number which is stored in the host computer and which corresponds to the card information thus read.

(9) If the numbers differ, this fact is recorded on the magnetic recording portion of the card, and the inputting of the personal identification number is requested again. In a case where the personal identification number inputted again is proper and valid, subsequent procedure is carried out. In a case where the inputted number differs from the stored number, the inputting of the personal identification number is requested further again. If erroneous inputting of the personal identification number is repeated three times, the card is invalidated and is, for example, taken into the terminal device as the result of invalidation procedure.

(10) In a case where the personal identification numbers are equal, the host computer judges that the card user is a legitimate card owner and requests the user to input the amount to be paid.

(11) The user inputs the amount which he (she) wishes to draw.

(12) When the amount to be paid is proper, the amount is paid and the cash card is discharged from the terminal device. Then, the payment is recorded on a bankbook, or a slip indicating the dealing is issued, and the processing finishes. If the personal identification number is recorded on the cash card, the dealing is carried out under the assumption that the personal identification number is valid. Then, the personal identification number is erased from the magnetic recording portion.

FIG. 2(a) illustrates an example of the cash card used in the processing flow of the currently used cash card as shown in FIG. 1. The reference number 1 shows a cash card body made of a material such as plastics. On the surface of the card, a magnetic stripe 2 where information is recorded and an arrow mark 3 to indicate the direction to insert the cash card are disposed. Although not shown in the drawing, other necessary matters are entered thereon by embossed characters. As information written in the magnetic stripe can be easily read by using a device called a skimmer, the card may be forged, and often causes damage by using the card thus forged.

To cope with this problem, an IC card incorporating a semiconductor memory has been used. Banks and other organizations have been making efforts to propagate this type of card to replace the magnetic card.

However, the information stored in the memory of the IC card is still possible to be read. If more elaborate forgery is attempted, we may not be able to say that the IC card is absolutely safe. In addition, the IC card is very expensive compared to the magnetic card, and it would be hard to expect the rapid propagation of IC cards.

In case of the cash card used in banks, it would suffice if the card can be used within the boundary of one country. However, in case of the credit card, the card is necessary to be used also in foreign countries. It is practically impossible to replace all of the credit cards, i.e. magnetic cards, used in the whole world with IC cards under unified standards.

Further, in cash cards and credit cards, the information such as the name of the card owner is marked by embossing, and these types of information are also used for the magnetic information. In this respect, the embossed information may be used as a clue or a key in the preparation for forging a card.

If the magnetic card or the IC card is lost or stolen, the card owner may easily become aware of the fact of loss or theft. However, when the card returned into the hand of the card owner after it has been stolen, in particular, when the card owner does not aware of the fact of stealing, it is liable to cause damage by the use of the forged card.

A personal identification number, consisting of 4-digit numbers, has been used not for preventing cards from being illegitimately used by the prevention of the forgery but as the means to determine whether or not the card user is proper. Since assumable numbers have been often used for these personal identification numbers, there have been many cases of the loss and damage. In recent years, the personal identification number is stolen not only by assumption of it but also by peeping such as the means of stealthily taking a photograph of the personal identification number. It is now very difficult to prevent the illegitimate use of cards by using the personal identification number.

For the purpose of preventing the damage caused by the forged card, some adopts the biometric technique using the pattern-recognition technology. The typical examples of the biometric technique are iris recognition, fingerprints recognition, palm-prints recognition, finger vein recognition, palm vein recognition, and hand-back vein recognition. These recognition is, except iris recognition, contact-type or non-contact-type. It is necessary for the recognition to register the pattern in advance. Time and procedures are required for the registration of the pattern, and also time is needed for the recognition of the pattern itself and for determining, and that results higher costs.

In case of the contact-type recognition, the user must come into direct contact with the detection device, and there arises a problem that the user may feel physiological repugnance or disgust. Also, in a case where the user has injury on the physical part necessary for the biometrical recognition, or in the worst case where the user has lost the physical part to be needed for the recognition, it is impossible to use the biometrical recognition. Also, the recognition is partially made during the process of identifying, and accordingly, it is not a perfect method.

In the system using the biometrical recognition, the card user himself or herself can only use his or her own card. When the card user has not enough time to use the card personally or does not find a card processing device nearby, even if the user wants to entrust a representative or an agent to use the card, it is not allowed. This is very inconvenient for the user.

As one of the means for preventing the forgery, an embossed hologram is mounted to form surface irregularities on the plastic surface in case of credit cards, prepaid cards, securities, etc. This embossed hologram is very difficult to duplicate. In this respect, it is actually impossible to forge the card provided with the embossed hologram. In the current condition of the use, however, it is a person, who read the embossed hologram at a glance. Thus, it is possible that the card is forged to use by using the embossed hologram of similar type.

FIG. 2(b) illustrates an example of a credit card with the embossed hologram, on which the card authentication is verified according to the human sense. The reference numeral 1 shows a credit card body made of a material such as plastics. On the surface of the card, a magnetic stripe 2 where information is recorded and an arrow mark 3 to indicate the direction to insert the credit card are disposed. Although not shown in the drawing, other necessary matters are entered thereon by embossed characters.

This credit card 1 is inserted into a terminal device with a portion with the arrow mark placed at the foremost position. Near the foremost portion on the card, an authentication verifying chip 4 consisted of, for example, an embossed hologram is mounted.

The magnetic stripe is disposed, unlike the cash card, on the rear surface of the credit card, but the direction to insert the card into the terminal device is the same. As a result, the direction to read the magnetic information on the credit card is reverse to that of the cash card.

In the verifying chip 4, a pattern "A", as an example, is confirmed by a person, who inserts the card into the terminal device, visually, i.e. by sensuous means, but is not read by the card terminal device.

The authentication verifying by sensuous means provides high effects in primary screening but its reliability is low because there are variations in the ability of each individual person who confirms and identifies or there are also variations in the identifying environment and psychological and/or physical conditions of the person.

When verifying the authentication by using an auxiliary tool, it is carried out by ultra-fine lines, special lines and micro-characters by using a screen with special shape, a magnifying device such as a magnifying glass or a special type filter generating optical interferences.

Practically, a material having a special optical property is mixed into the base material, laminated film or ink using such as a base material with light-emitting property, a light-emitting laminated film, light-emitting ink, thermo-chromic ink, photo-chromic ink, etc., and the auxiliary tool of a special filter, a ultra-violet ray lamp, etc. is used. However, these are also low in reliability because recognition and identification are consequently relying on the human sense.

The authentication verifying by mechanical processing is to verify authenticity by mechanically detecting the property of the object material. The magnetic property and the optical property may be used for the detection.

Practically, a light-emitting material or a magnetic material is mixed into a base material, laminated film or ink and a detection device is used. Or, specific coded information is magnetically or optically added by using OCR characters or magnetic barcodes, and a magnetic or optical detection device is used.

In the authentication verifying by the mechanical processing, an artifact-metrics system using an artifact without having reproducibility, randomly arranged in a medium, is used instead of the information specific to the living body. This is described in "Financial Business and Artifact-Metrics" published by the Institute for Monetary and Economic Studies, the Bank of Japan (http://www.imes. boj.or.jp/japanese/jdps/2004/04-J-12.pdf) and "The Patterns of Artifact-Metrics in Financial Field"; 6th Information Security Symposium (http://www.imes.boj.or.jp/japanese/kinyu/2004/kk23-2-6.pdf).

In the artifact-metrics system, a light reflecting pattern of granular substances, a transmission light pattern of optical fibers, a parallax image pattern of polymer fibers, a fiber image pattern, a magnetic pattern of magnetic fibers, a random-recorded magnetic pattern, a random magnetic pattern of a magnetic stripe, a random electric charge pattern of a memory cell, a resonance pattern of electrically conductive fibers, a resonance pattern of a vibrating seal, etc., which are formed by chance, are used.

As the matters subject to the illegitimate use or the forgery of the card, "the information of the descriptions of the card" added when the card is issued to a user and "the information of the card" given to the card in the manufacturing process are included. ("Handbook on the Technique to Prevent Forgery on the Surface of Affiliated IC Cards", published by the National Printing Bureau, the Ministry of Finance (see: http://www.npb.go.jp/ja/info/ichb.pdf).

The information of the descriptions of the card is the information which is accorded and printed on the card body when issued to the user, and which is relating to the card issuance such as the card owner information, the period of validity, etc. Falsification, which is a typical act of the illegitimate use of the card, is an act to alter all or a part of the information of the descriptions of the card, done by erasing the genuine information and adding illegitimate information.

The information of the card is the information of the card itself, other than the information of the descriptions of the card in the issued card. It is the information relating to the card body such as the physical shape of the card, background patterns applied to the card in pre-printing factory, printing layer on underlying layer and laminated protective layer, etc.

Forgery is an illegal act carried out for the card body. It is carried out by duplicating or imitating the design, patterns, etc., relating to the card body to forge a card, which is similar to the authentic card in the external appearance. Actually, the design, patterns, etc. on the surface of the authentic card are read by the means such as a scanner, which are then, edited or amended by using the means such as a printer.

Many types of techniques to prevent the forgery of the card body are known through combining the printing mode, types of ink, printing patterns, etc., only in the printing art, but no decisive technique is known yet at present.

The methods for authentication verifying to recognize and identify the forgery can be roughly classified as a method based on human sensuous ability; a method using auxiliary tools; and a method by mechanical processing.

In the authentication verifying by the human sensuous ability, the authenticity of a card is identified by the sensuous ability such as the visual sense, the tactile sense, etc. The means to identify by the visual sense includes colors of the card itself, a watermark and a hologram, which changes the color and patterns provided on the card by changing the viewing angle. The means to identify by the tactile sense includes detecting the surface irregularities added on the card and detecting the texture of the card body itself.

Actually, a logo mark, a special font, printing lines for preventing duplication, special color ink, embossed hologram, an optically changing material, a latent image pattern, etc., which are difficult to duplicate or copy and in which the authenticity of the card can be easily identified by the visual sense are used. And embossing, surface irregularities, perforation, etc. are also used, on which the authenticity can be identified by finger feeling or by the visual sense.

FIG. 3 shows a conventional example of a card, to which an authentication verifying chip of an artifact-metrics chip using metal granules is mounted as disclosed in Japanese Patent Laid-Open Publication No. H10-44650. FIG. 3 (a) is a general view, FIG. 3 (b) is a cross-sectional view and FIG. 3 (c) is an enlarged view of the verifying chip.

In the card 1, the artifact-metrics chip 4 in thin-plate shape made of a light transmitting resin mixed with metal granules 5 is layered on a card base member 7, having a light non-transmitting property, which has an opening for the identification purpose on it. And a non-transparent card surface plate 6 is further layered, in which a magnetic stripe 2 and an arrow mark 3 are formed thereon and another opening is arranged at the same position as the opening on the card base member 7.

The metal granules 5 are mixed three-dimensionally in the light transmitting resin without regularity. As a result, the arrangement pattern of the metal granules 5 observed through the opening is inherent in each of the artifact-metrics chip 4.

By utilizing these characteristics, a light to pass through the artifact-metrics chip 4 is photographed via the opening, and the arrangement pattern of the metal granules 5 can be observed. Therefore, it is possible to identify each individual artifact-metrics chip 4 and then, the card.

FIG. 4 shows another conventional example of a card, to which a verifying chip of an artifact-metrics chip using fibers as disclosed in Japanese Patent Laid-Open Publication No. 2003-29636. FIG. 4 (a) is a general view, FIG. 4 (b) is a cross-sectional view and FIG. 4 (c) is an enlarged view of the artifact-metrics chip. In the card, the artifact-metrics chip 8 containing a mesh member 9 and short fibers 10 three-dimensionally mixed in a transparent resin is placed into an opening of the card base member 1, which has a non-transparent property, and a magnetic stripe 2 and an arrow mark 3 are disposed on the surface thereof. On the artifact-metrics chip 8, an interference pattern is generated by the pattern of the mesh member 9 and the short fibers 10.

This interference pattern is inherent in each of the artifact-metrics chip 8, i.e., in each card. By utilizing this characteristic, the pattern of the artifact-metrics chip 8 of the verifying chip is photographed by a transmitted light or a reflected light for the card to be identified.

Mechanical reading of such the pattern of biometrics or artifact-metrics is generally performed by an image-pickup device and the result is identified by a pattern-recognition technique. In this respect, there is a possibility that forgery can be made according to a duplicating technique.

As the artifact-metrics chip consists of a real substance, not of an image, it is impossible to arrange the component elements of the artifact-metrics chip intended for the forgery identical to those of the authentic one. However, the possibility that the same pattern may appear according to the same component elements, even though incidentally, cannot be entirely denied. Therefore, a forged object thus obtained incidentally can be regarded as the authentic object. For this reason, it is very risky to confirm whether the card is authentic or not, depending only on the artifact-metrics chip.

As described above, the technique to determine the authenticity of the card itself is not yet firmly established, and a card, which cannot be forged, is not realized. Also, the technique to eliminate the use of a forged card is not yet realized.

[Patent Document 1] Japanese Patent Laid-Open Publication No. H10-44650

[Patent Document 2] Japanese Patent Laid-Open Publication No. 2003-29636

[Non-Patent Document 1] "Financial Business and Artifact-Metrics" published by the Institute for Monetary and Economic Studies, the Bank of Japan (http://www.imes.boj.or.jp/japanese/jdps/2004/04-J-12.pdf)

[Non-Patent Document 2] "The Patterns of Artifact-Metrics in Financial Field"; 6th Information Security Symposium (http://www.imes.boj.or.jp/japanese/kinyu/2004/kk23-2-6.pdf)

[Non-Patent Document 3] "Handbook on the Technique to Prevent Forgery on the Surface of Affiliated IC Cards", published by the National Printing Bureau, the Ministry of Finance (see: http://www.npb.go.jp/ja/info/ichb.pdf).

DISCLOSURE OF THE INVENTION

Object of the Invention

The present invention provides a card for increasing security without adding basic changes to a cash card or a credit card as practically used, and a method for processing the card.

It is an object of the present invention to alleviate the burden on authentication verifying work and to exclude the possibility that a forged object obtained incidentally or by chance is regarded as an authentic object.

Means for The Object

To attain the above object, in the invention of the present application, an authentication verifying chip difficult to be forged is added and an authentication verifying device is added to a device for processing the card for authentication verification of the card.

The following can be adopted for the authentication verifying chip: granules such as metal granules dispersed in a transparent medium; fiber pieces dispersed in a transparent medium; an interference pattern between a pattern having regularity arranged in a transparent medium and fiber pieces dispersed in the transparent medium; an embossed hologram; fluorescent granules dispersed in a transparent medium; and radioactive substance granules dispersed in an arbitrary type of medium.

Further, in addition to the verifying chip, another type of chip is provided. The information described in the verifying chip is digitized and the digitized data is encrypted. Then, the encrypted data is entered in the latter chip, and this is used as an authentication certifying chip.

When the card is used, the image of the verifying chip on the card is read and digitized. At the same time, the encrypted data of the authentication certifying chip on the same card is decrypted. The data decrypted from the certifying chip is compared with the data of the verifying chip. If these are equal to each other, the card is identified as an authentic card. If not, the card is judged as a forged card.

For a cryptosystem, as the simplest way, it is used a secret-key cryptosystem where only the card issuer knows the secret-key. It is also possible to use a public-key cryptosystem, in which different keys are used for encryption and decryption. In the public-key cryptosystem, a public-key and a private-key are used and either key can be used for encryption or decryption.

To alleviate the burden of encryption/decryption, hash algorithm such as MD5 (Message Digest 5), SAH-1 (Secure Hash Algorithm-1) SAH-2, etc., are used.

For example, the card ID and information of the card owner are added or mixed into the digitized data and are encrypted on the whole. Further, a digital watermark is entered to the digitized data. Turning of the digital data to hash value, adding the ID and owner information and entering the digital watermark may be adopted alone or in combination.

In the device for processing the card, the authenticity of the card is identified prior to the starting of actual operation such as inputting the personal identification number. The device discharges the forged card or gives a warning, or takes the forged card into the device.

Effects of the Invention

Granules such as metal granules dispersed in a transparent medium, fibers dispersed in a transparent medium, an interference pattern between a pattern having regularity arranged in a transparent medium and fibers dispersed in the transparent medium, fluorescent granules dispersed in a transparent medium and radioactive substance granules dispersed in an arbitrary type of medium can be obtained only incidentally or by chance, and are impossible to be duplicated. An embossed hologram has a three-dimensional structure, and is also impossible to be duplicated unless a replica is produced directly from the prototype.

Also, a forged card attempted by duplicating the magnetic recording data or the data in an IC chip can be excluded, and it cannot be used.

Further, when it is attempted to illegally use the card, such the use can be rejected and damage or loss can be prevented before it actually occurs. Or, an illegitimate card may be allowed for the use to some extent, but it enables to easily specify the user of the illegitimate card by finally ensuring to hold the illegitimate card.

In a case where the verifying chip and the certifying chip are both present on a single card, the authenticity of the card can be confirmed without resort to the host server, if a crypt key is given to the terminal device such as an ATM.

Even when the same artifact-metrics are obtained by chance and the same hash value is obtained incidentally, unless algorithm of ID of the card or information of the card owner further added or mixed to the hash value is known, it is not possible to know the crypt key used for encryption. Thus, the degree of security is very high.

BRIEF DESCRIPTION OF THE DRAWINGS

FIG. 2 shows a conventional type cash card;

FIG. 3 shows an example of a conventional type card using artifact-metrics;

FIG. 4 shows another example of a conventional type card using artifact-metrics;

FIG. 8 shows examples of the mounting position of the verifying chip;

FIG. 9 shows other examples of the mounting position of the verifying chip;

FIG. 11 shows the verifying chip prepared according to random numbers;

FIG. 12 is an example of random numbers to be used in the verifying chip;

FIG. 13 shows an arrangement example of random numbers to be used in the verifying chip;

FIG. 14 shows an example where the random numbers used in the verifying chip are in binary numbers;

FIG. 15 shows an example where the random numbers used in the verifying chip are arranged as binary numbers;

FIG. 16 shows an example of the additional random numbers used in the verifying chip;

FIG. 17 shows an example where additional random numbers used in the verifying chip are in binary numbers;

FIG. 18 shows an example where additional random numbers used in the verifying chip are in quaternary numbers;

FIG. 19 shows an example where the random numbers used in the verifying chip are arranged in quaternary numbers;

FIG. 20 shows examples where another authentication verifying chip is obtained from the verifying chip prepared on random numbers;

Figure 1:
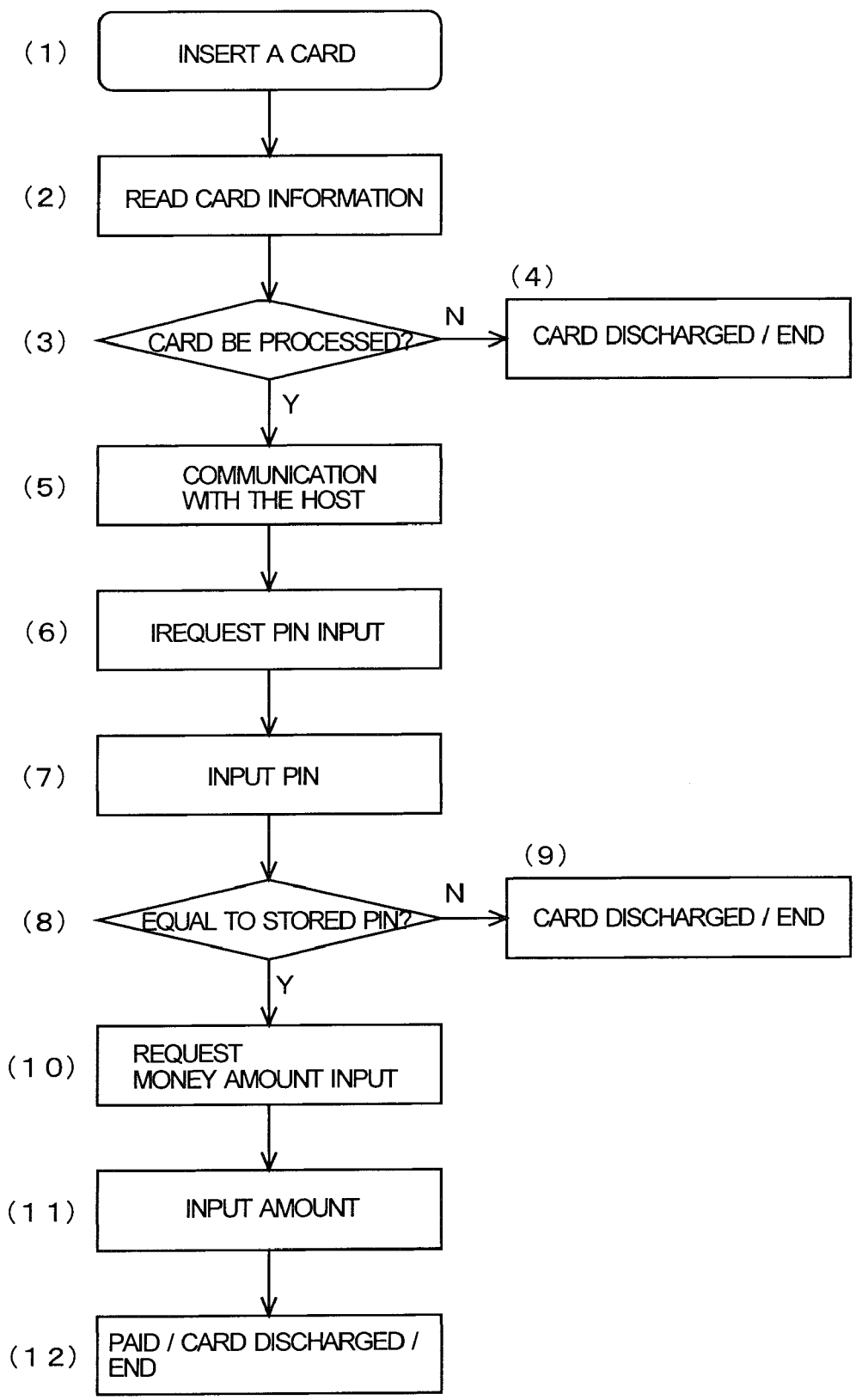
FIG. 1 is a flow chart to show a flow of the processing of a currently used cash card.

BRIEF DESCRIPTION OF THE REFERENCE NUMERALS 1 card
2 a magnetic stripe
3 an arrow
4, 8, 12, 15, 18, 21, 22, 32, 42, 46, 61 an authentication verifying chip
5 metal granules
6, 14, 34, 44 a surface plate
7, 35, 45 a card base member
9 a mesh member
10 short fibers
11, 31, 41 a card capable of the authentication verifying
16, 19, 22, 23, 25 a pit
17, 20, 24 a portion where the pit is not formed
33 fluorescent granules
43 radioactive substance granules
47 an IC chip
48 a position alignment mark
49 a line to start the reading
50 a line to finish the reading
51, 52 a line to indicate the end portion
62, 64, 66, 68 an authentication certifying chip
60, 63, 65, 67 a card capable of the authentication certifying

BEST MODE FOR CARRYING OUT THE INVENTION

Description will be given below on the best aspect for carrying out the invention by referring to the accompanied drawings.

First, the following describes an authentication verifying chip for a card.

Embodiment 1 of the Authentication Verifying Chip

Figure 5:
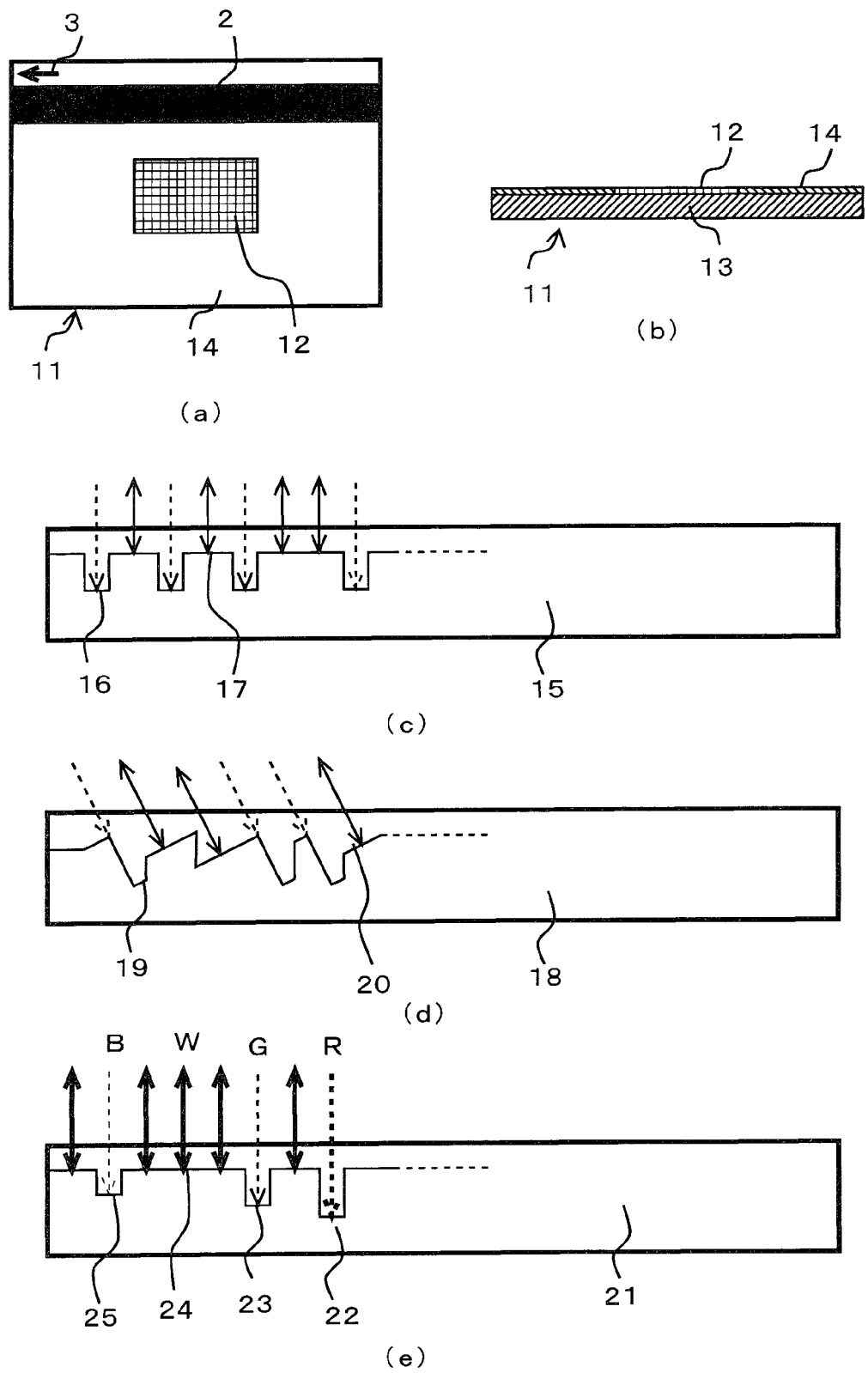
FIG. 5 shows an example of a card, on which an authentication verifying chip is mounted.

FIG. 5 shows a basic arrangement of a card, on which an embossed hologram chip is mounted as a verifying chip according to the embodiment 1. FIG. 5 (*a*) shows a general view, FIG. 5 (*b*) is a cross-sectional view, and each of FIGS. 5 (*c*) to (*e*) shows an enlarged view of the embossed hologram chip.

A card 11 comprises a surface plate 14 with an opening being mounted on a card base member 13 having a non-transparent property, and an embossed hologram chip 12 being placed into the opening. On the surface plate 14, a magnetic stripe 2 and an arrow mark 3 are disposed.

The embossed hologram is composed of a pit portion with depth equal to ¼ wavelength of a laser beam used and a portion where the pit is not formed. On the pit portion, a reflected laser beam is eliminated by an incident laser beam, and the reflected laser beam is not detected. On the portion without the pit, the reflected laser beam is detected as not eliminated by the incident laser beam.

The laser beam used is an infrared laser beam with λ (lambda)=780 nm (λ/4=195 nm) in case of a CD. In case of a DVD, a red laser with λ=650 nm (λ/4=151.25 nm) is used. In case of the next generation DVD, using a blue-violet laser with λ=405 nm, an ultraviolet laser with λ=351 nm or a far ultraviolet laser with λ=266 nm is under study. λ/4 is 101.25 nm, 87.75 nm or 66.5 nm respectively.

FIG. 5 (*c*) shows the most basic structure. Pit portions 16 with the depth of ¼ wavelength of the laser beam used and portions 17 without a pit are arranged with an adequate distance between them one another on a hologram chip 15. In the example shown in this figure, each solid line shown by bidirectional arrows indicates that both incident light and reflected light are present. Each broken line shown by a uni-directional arrow indicates that there is incident light but no reflected light is present.

FIG. 5 (*d*) shows an example where the direction of the laser beam is inclined. Unless information on the tilt angle is available, it is difficult to read the data written therein. In this example, inclined pit portions 19 with the depth of ¼ wavelength of the laser beam used and inclined portions 20 without a pit are arranged with an adequate distance between them one another on a hologram chip 18. In the example shown in this figure also, each solid line shown by bidirectional arrows indicates that both incident light and reflected light are present, and each broken line shown by a unidirectional arrow indicates that there is incident light but reflected light is not present. It is almost impossible to duplicate this structure. It is possible that the structure shown in FIG. 5 (*c*) and the structure shown in FIG. 5 (*d*) coexist.

FIG. 5 (*e*) shows an example where laser beams with a plurality of wavelengths are used. Unless information on all of the laser beams used is available, it is difficult to read the written data. In this example, a pit portion 22 with the depth of ¼ wavelength of the red (R) laser beam; a pit portion 23 with the depth of ¼ wavelength of the green (G) laser beam; a pit portion 25 with the depth of ¼ wavelength of the blue (B) laser beam; and a portion 24 without a pit are arranged with an adequate distance between them one another on a hologram chip 21.

In the example shown in this figure also, each solid line shown by bidirectional arrows indicates that both incident light and reflected light are present. Each broken line shown by a uni-directional arrow indicates that there is incident light but no reflected light is present. It is almost impossible further to duplicate this structure. It is also possible that the structure shown in FIG. 5 (*d*) and the structure shown in FIG. 5 (*e*) coexist.

Embodiment 2 of the Authentication Verifying Chip

Figure 6:
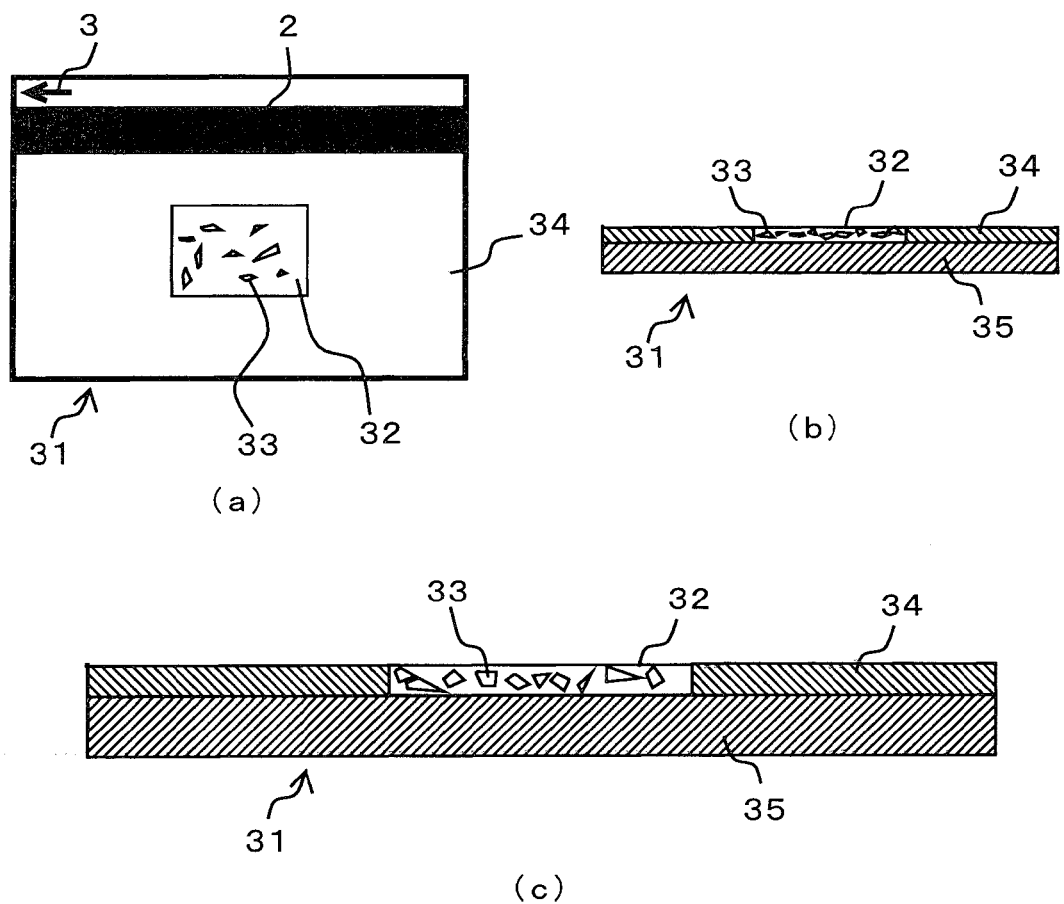
FIG. 6 shows another example of a card, on which the verifying chip is mounted.

FIG. 6 shows Embodiment 2 of the verifying chip. FIG. 6 (*a*) shows a drawing where a card is seen from above; FIG. 6 (*b*) is a cross-sectional view of the card; and FIG. 6 (*c*) is an enlarged view of the cross-sectional view. A card 31 comprises a surface plate 34 with an opening being mounted on a card base member 35 having a non-transparent property and a verifying chip 32 composed of fluorescent substance granules 33 mixed in synthetic resin being placed into the opening. Another surface plate may be layered on the verifying chip 32 and the surface plate 34.

The card base-plate 35 is a thick plate made of synthetic resin widely used in a cash card or the like or a thin plate made of synthetic resin used in a prepaid card or the like. The verifying chip 32 has such the area and such the thickness that it can be placed into the opening of the surface plate 34, and fluorescent substance granules 33 are mixed therein.

For the material of the surface plate 35, either of synthetic resin transparent to the incident light and to the reflected light for the card or synthetic resin non-transparent to the incident light and/or the reflected light for the card and to other visible lights may be used. For the surface plate layered further on the verifying chip 32 made of synthetic resin and the surface plate 34, synthetic resin transparent to the incident light and the reflected light is used.

Embodiment 3 of the Authentication Verifying Chip

Figure 7:
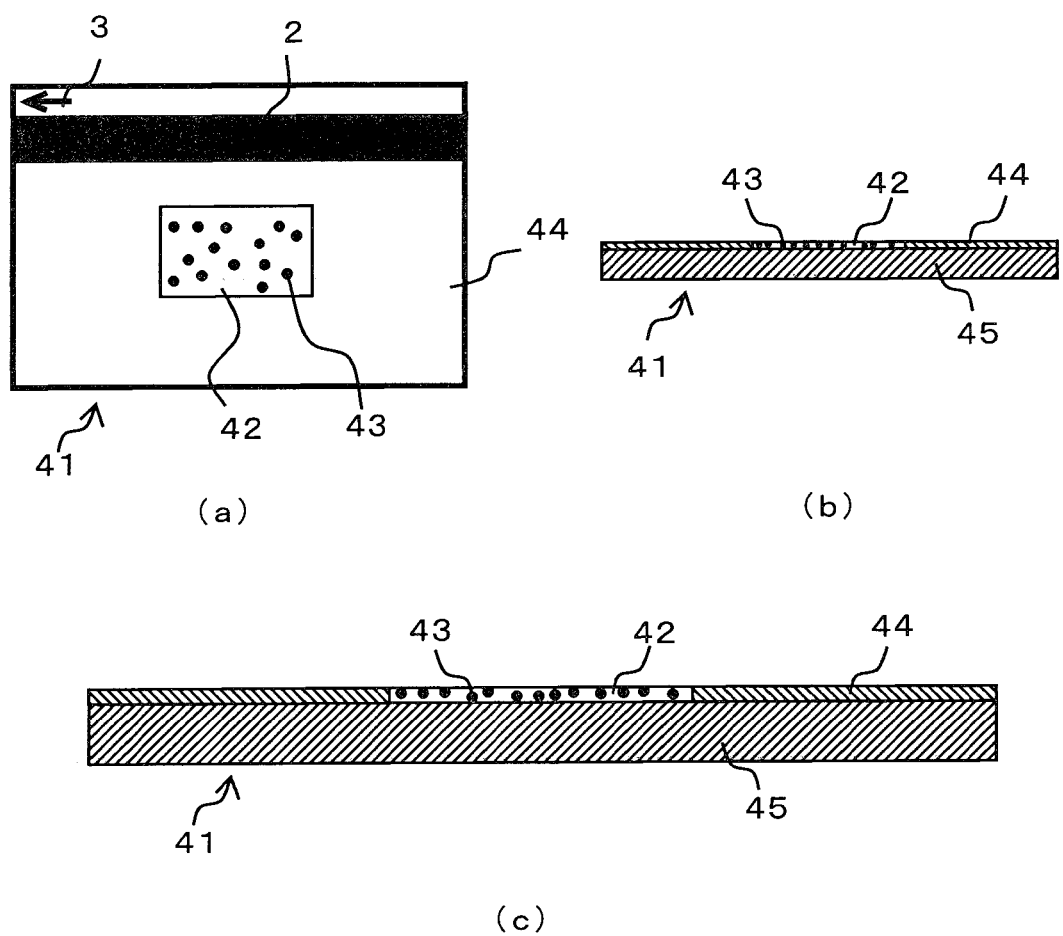
FIG. 7 shows still another example of a card, on which the verifying chip is mounted.

FIG. 7 shows Embodiment 3 of the verifying chip. FIG. 7 (a) shows a drawing where a card is seen from above; FIG. 7 (b) is a cross-sectional view; and FIG. 7 (c) is an enlarged view of the cross-sectional view. A card 41 comprises a surface plate 44 with an opening being mounted on a card base member 45 having non-transparent property and a verifying chip 42 with radioactive substance granules 20 mixed in synthetic resin being placed into the opening. On the surface plate 44, a magnetic stripe 2 and an arrow mark 3 are disposed.

The arrangement pattern of the mixed radioactive substance granules is inherent in the verifying chip 42, i.e., in the card 41, and the card is identified by this characteristic.

Example of the Mounting Position for the Authentication Verifying Chip

FIG. 8 shows examples of the mounting position of the verifying chip on a card according to the structural features as described above. The verifying chip 46 can be mounted, other than the position at about the central portion of the card body as shown in FIG. 5 to FIG. 7, at the following positions: at the foremost position in the middle portion as shown in FIG. 8 (a); at the central position in the middle portion as shown in FIG. 8 (b); at the posterior position in the middle portion as shown in FIG. 8 (c); at the foremost position in the lower portion as shown in FIG. 8 (d); at the central position in the lower portion as shown in FIG. 8 (e); and at the posterior position in the lower portion as shown in FIG. 8 (f). While it can also be mounted at a position in the upper portion, it is desirable for the mounting position to avoid the position in the upper portion, when there may be influence on the reading of the information from the magnetic stripe.

Example 2 of the Mounting Position for the Authentication Verifying Chip

From the viewpoint of maintaining higher security for the card or of providing better convenience, attempts are being made to use the IC chip in an information storage medium. The IC chip has a semiconductor memory in it. If the semiconductor memory is irradiated by an electron beam, in particular, by β, (beta) ray, the memory written may be changed in some cases.

Among the radiations, α (alpha) ray can be shielded even by a piece of paper. For this reason, there is almost no need to give consideration on the influence to the semiconductor memory. However, for the purpose of shielding β ray, an aluminum plate of 1 mm in thickness or an acrylic plate of 10 mm in thickness is needed. Therefore, in a case where radioactive substance granules emitting β ray are used, the influence by β ray can be avoided by disposing a verifying chip 46 and an IC chip 47 with a distance of 10 mm or more from each other.

Reading Position of the Authentication Verifying Chip

Physical standards for a cash card and a credit card are strictly stipulated from the viewpoint of the practical use. Accordingly, physical standards of the components to be mounted on it are also strictly provided. However, it is not entirely deniable that deformation may occur due to the excessive use.

Figure 10:
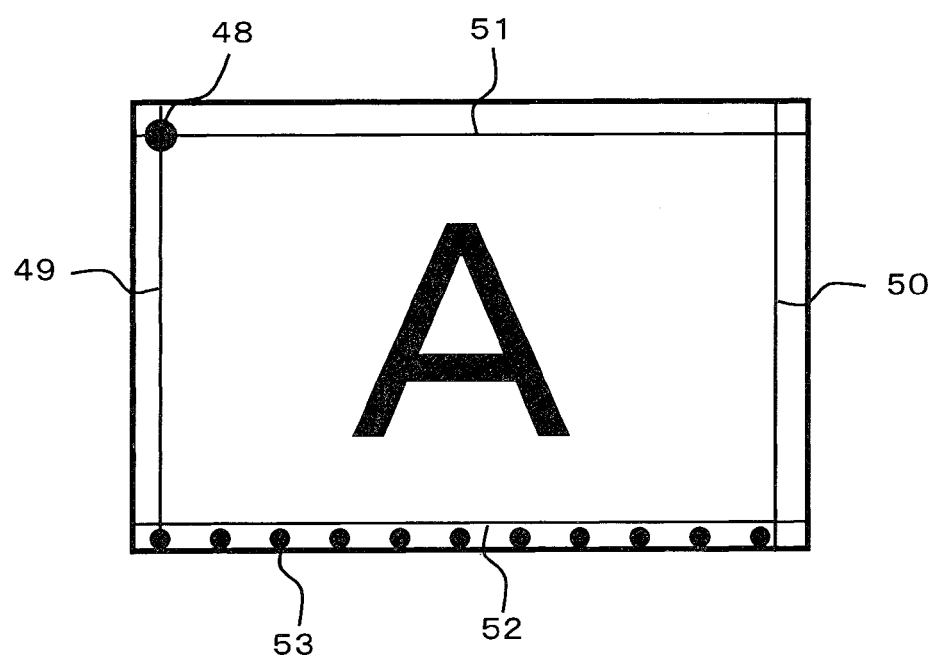
FIG. 10 illustrates a mark for the position alignment.

To cope with such the problem, it is desirable to arrange a position alignment mark 48 as shown in FIG. 10 on the verifying chip. In a simple case, only one position alignment mark may suffice. However, in order to ensure the more reliable position alignment, it would be desirable to have plural marks.

In order to perform the reading more reliably, at the same time with the use of the position alignment mark, it would be desirable to arrange some other marks at the position to start the reading and the position to finish the reading of the authentication verifying chip. For instance, a line 49 to start the reading in moving direction and a line 50 to finish the reading in moving direction and further, lines 51 and 52 to indicate the end portions may be arranged.

The reading of data on the verifying chip is performed by the relative movement of the authentication verifying chip and the reading device. To ensure the reliable reading, it is necessary to synchronize the movements of the authentication verifying chip and the reading device. If a mark for synchronization signal 53 is disposed on the verifying chip, the movement of the reading device can be synchronized according to the reading of the mark.

The reading start line and the reading finish line and/or the mark for synchronization signal can be also used for signal normalization in the signal processing. The position alignment mark, the reading start/finish lines and/or the mark for synchronization signal are made of fluorescent substance. For instance, these can be prepared by an adequate printing means such as an ink jet printer.

Embodiment 4 of the Authentication Verifying Chip

The authentication verifying chips on the card as shown in FIG. 6 to FIG. 7 are of artifact-metrics. The artifact-metrics cannot be forged, while it is also impossible to control the pattern when manufacturing. In FIG. 11 to FIG. 20, examples of the arrangement of the verifying chip by using binary data suitable for mechanical reading, prepared by a computer are shown.

In the verifying chip shown in FIG. 11, 1024 binary data are arranged in a matrix form of 32×32. In this figure, the position where binary data "0" is written is shown in blank, and the position where the binary data "1" is written is shown with the mark "*".

Now, a method to obtain the binary data is described. FIG. 12 shows an example of true random numbers with hexadecimal numbers of 256 digits, which are obtained by detecting a radiation ray irradiated as the result of nuclear fission of radioactive substance. Random numbers used for a crypt key or the like are generally supplied as hexadecimal numbers as such. FIG. 13 shows hexadecimal random numbers shown in FIG. 12 arranged in the matrix form of 8 columns×32 rows.

The hexadecimal numbers can be expressed by replacing with binary 4-digit numbers. That is, "0" of the hexadecimal number corresponds to "0000" of binary numbers. Similarly, "1" corresponds to "0001", "2" corresponds to "0010", "3" corresponds to "0011", "4" corresponds to "0100", "5" corresponds to "0101", "6" corresponds to "0110", "7" corresponds to "0111", "8" corresponds to "1000", "9" corresponds to "1001", "A" corresponds to "1010", "B" corresponds to "1011", "C" corresponds to "1100", "D" corresponds to "1101", "E" corresponds to "1110" and "F" corresponds to "1111".

Based on the expressions as given above, 256-digit hexadecimal random numbers shown in FIG. 12 are substituted by binary random numbers as shown in FIG. 14. One digit of the hexadecimal number can be replaced by 4-digit binary numbers. Thus, 256-digit hexadecimal numbers correspond to 256 digits×4 digits=1024 digits in binary numbers. These binary numbers can be obtained directly in a random number generator, and in such a case, it is not necessary to perform the substitution operation.

These numbers are arranged in the matrix of 8 columns×32 rows in FIG. 13 and further arranged, for each digit of binary numbers, in the matrix of 32 columns×32 rows as shown in FIG. 15.

Finally, the position corresponding to "0" of the binary number in the matrix of FIG. 15 is left without writing the information. Information is written to the position with the mark "*" corresponding to "1". The arrangement of the authentication verifying chip as shown in FIG. 11 is thus, obtained. The verifying chip prepared in this way has the information of 32 column×32 rows×1 bit=1024 bits for authentication verifying, that is, it has an authentication verifying key of 1024 bits.

For the embossed hologram shown in FIG. 5 (c) and the fluorescent substance shown in FIG. 6, the lights with a plurality of wavelengths can be used. Next, an example of the pit arrangement of a verifying chip of a card, which is of binary data suitable for mechanical reading, and is prepared by computer and which uses the lights of generally called red (R), green (G) and blue (B) is described.

These "R", "G" and "B" can express the total of four conditions including "0" where no data is written. In other words, these can be handled as quaternary numbers. The quaternary numbers can be expressed by four 2-bit numbers: "00", "01", "10" and "11".

FIG. 16 shows hexadecimal random numbers of 256 digits shown in FIG. 12 and further hexadecimal random numbers of 256 digits which antecede those. Here, what is shown as "hexadecimal random numbers group a" is the same random numbers as shown in FIG. 12, and "hexadecimal random numbers group b" is the random numbers, which antecedes "hexadecimal random numbers group a".

These hexadecimal random numbers group is converted to a binary random numbers group. FIG. 17 shows the random numbers divided for every 2 bits in order to convert to the quaternary numbers expressed as "0", "R", "G" and "B".

Figure 18:
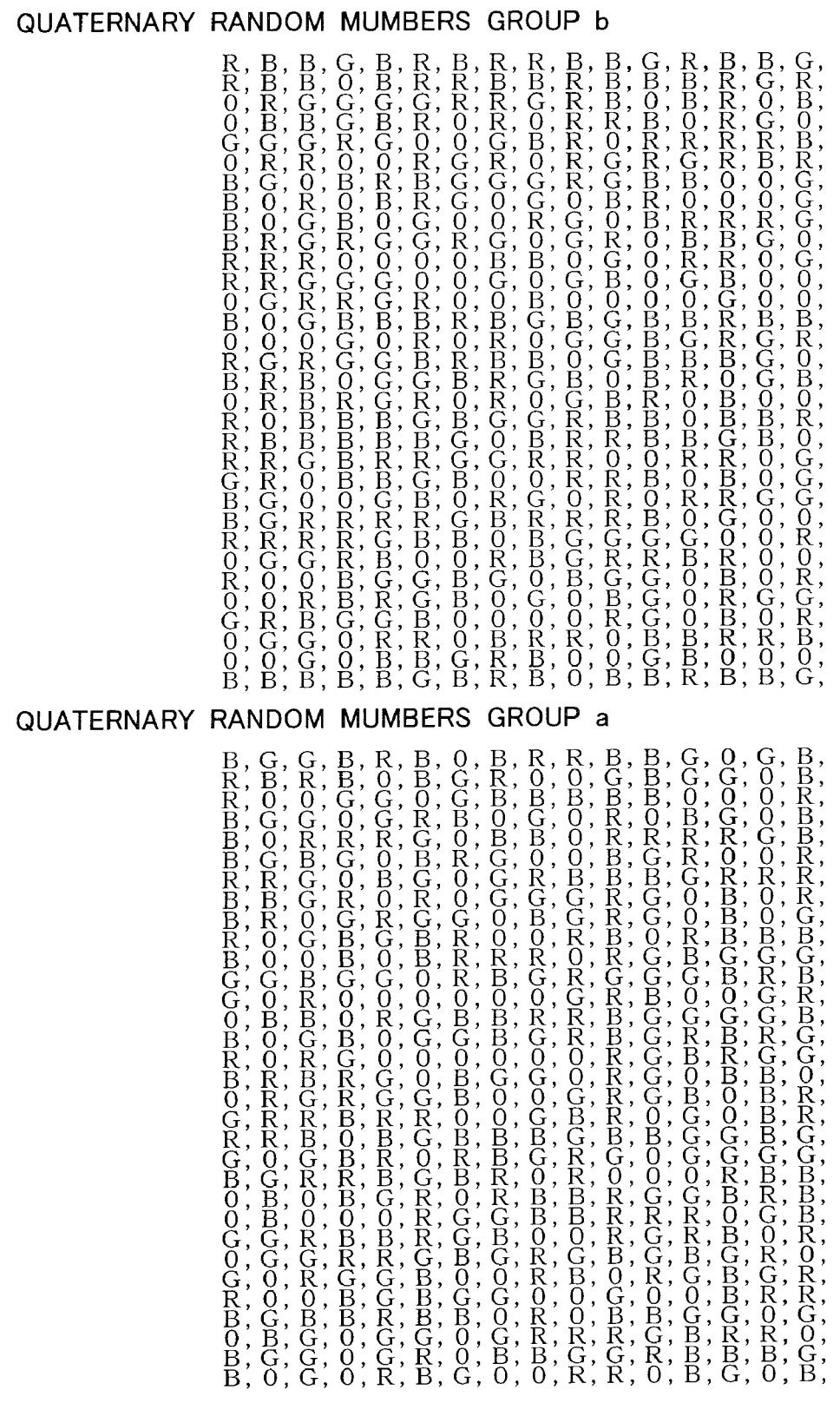

Further, binary number "00" is converted to quaternary number "0", binary number "01" to quaternary number "R", binary number "10" to quaternary number "G" and binary number "11" to quaternary number "B" as shown in FIG. 18.

The quaternary numbers thus obtained are arranged in the matrix of 32 columns×32 rows, similarly to the binary numbers shown in FIG. 11 or FIG. 15, and these are shown in FIG. 19. The verifying chip thus prepared has the information of 32 columns×32 rows×2 bits=2048 bits for authentication verifying, in other words, it has an authentication verifying key of 2048 bits.

Figure 20:
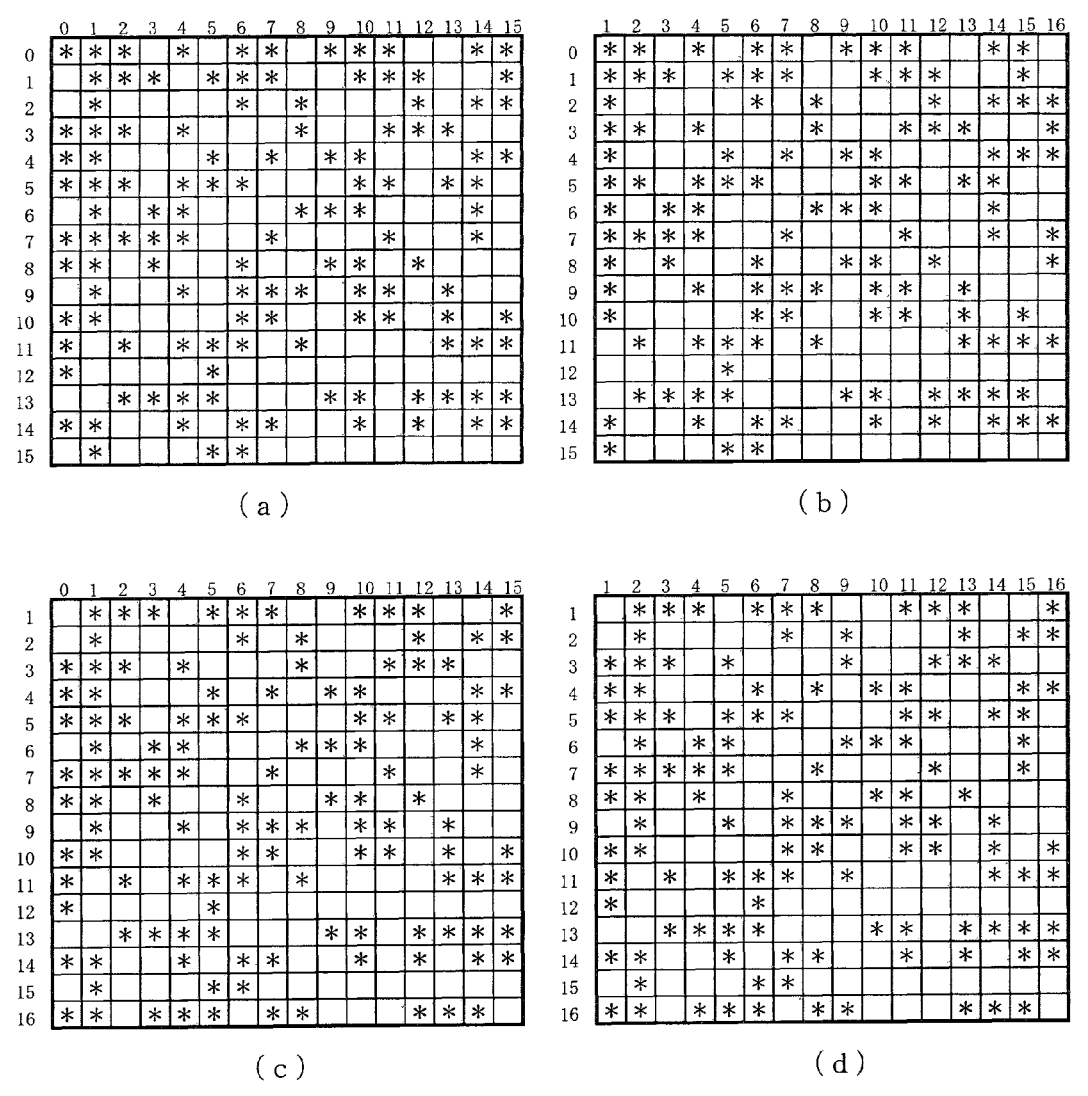

Now, referring to FIG. 20, a method to obtain a plurality of verifying chips from one random numbers group is described. FIG. 20 (a), FIG. 20 (b), FIG. 20 (c) and FIG. 20 (d) each shows a matrix pattern of 16×16 based on the matrix pattern of 32×32 in FIG. 11. FIG. 20 (a) has the origin at the coordinates (0,0), FIG. 20 (b) has the origin at the coordinates (1,0), FIG. 20 (c) has the origin at the coordinates (0,1) and FIG. 20 (d) has the origin at the coordinates (1,1). In this way, it is possible to have a plurality of matrix patterns from one matrix pattern obtained from the random numbers group shown in FIG. 12.

For the purpose of obtaining a plurality of matrix patterns from one random numbers group, it is also possible to use various methods such as a method to change the use position to start the random numbers group shown in FIG. 12 or a method to change the preparation position to start the matrix pattern shown in FIG. 13.

In so doing, a card issuer can maintain secrecy by arranging one random numbers group as a master random numbers group and can obtain a plurality of matrix patterns based on the master random numbers group. It is also possible to automatically control the plurality of matrix patterns based on the information of the origin.

In the examples shown in FIG. 11 and FIG. 15, the authentication verifying information is recorded by binary numbers expressed in 1 bit, and in the example shown in FIG. 19, the authentication verifying data is recorded by quaternary numbers expressed in 2 bits. In addition to these, it is also possible to use octal numbers expressed in 3 bits and hexadecimal numbers expressed in 4 bits.

Embodiment 1 of the Certifying Chip

Figure 21:
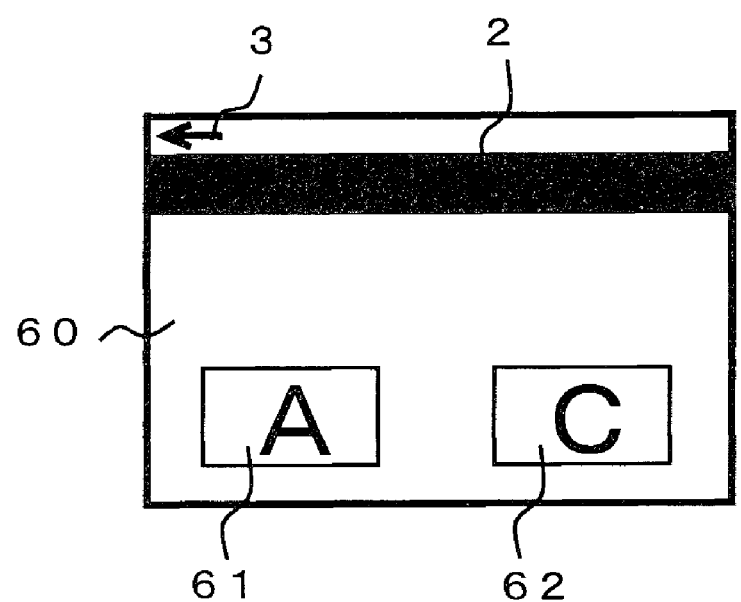
FIG. 21 shows an example of a card mounted with the authentication verifying chip and an authentication certifying chip.
Figure 22:
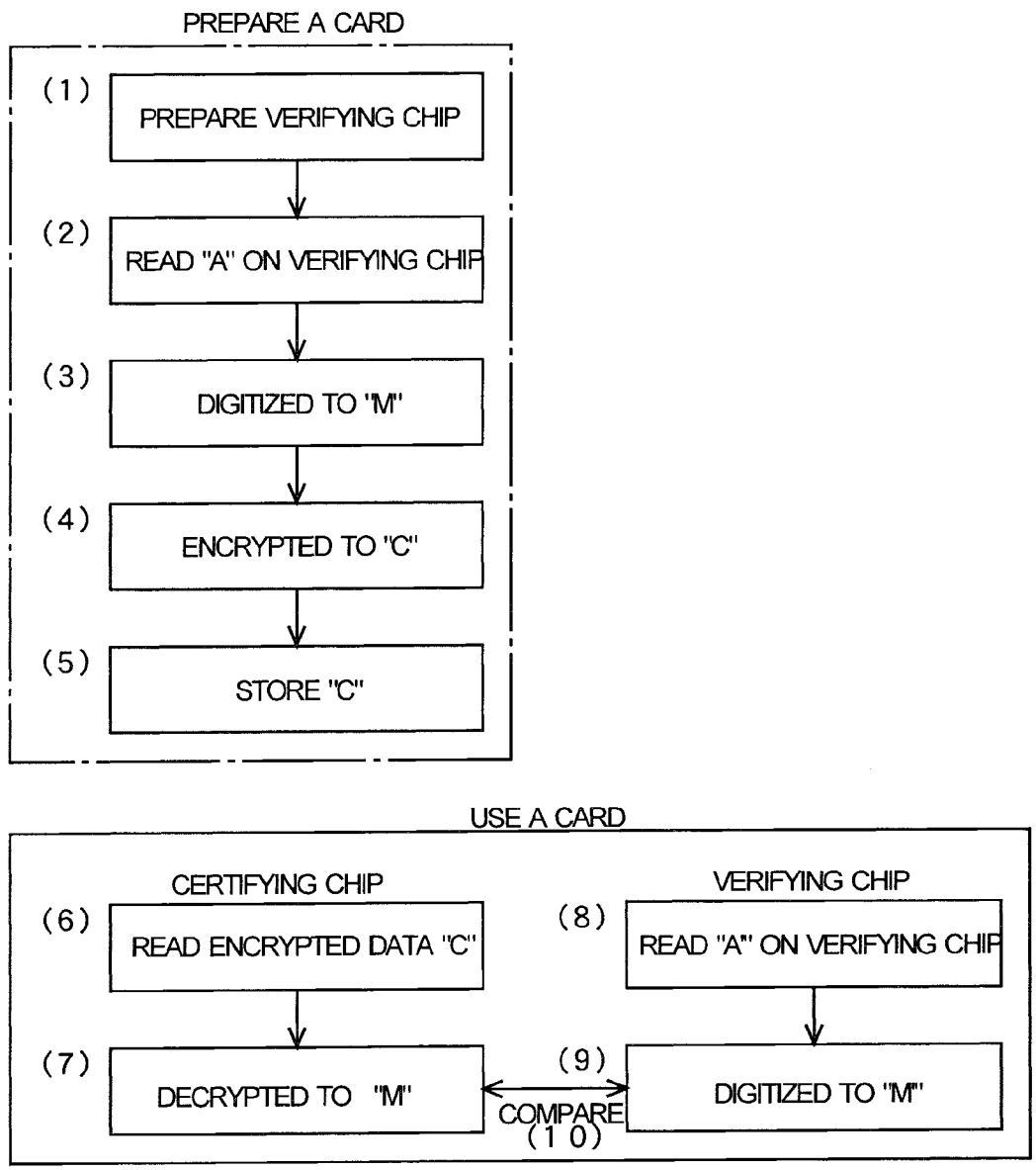
FIG. 22 is a flow chart to show a flow of authentication certifying of the card shown in FIG. 21.

FIG. 21 and FIG. 22 show an example of a card to certify the card itself. FIG. 21 illustrates the card and FIG. 22 shows the functions of an authentication verifying chip and an authentication certifying chip.

On a card 60, there are provided a verifying chip 61 where information for verifying a card Authentication "A" such as artifact-metrics is stored; and a certifying chip 62 where the authentication verifying information "A" is digitized to the digitized data Message "M" and is encrypted to the encrypted data "C" and is stored, and both are non-separably mounted on the card body. On upper portion of the surface of the card 60, a magnetic stripe 2 and an arrow mark 3 are disposed.

Instead of the magnetic stripe 2, or together with it, an IC chip can also be used. The verifying chip 61 and the certifying chip 62 may be arranged at separate positions respectively as shown in FIG. 21 or these may be disposed adjacent to each other or may be united.

Referring to FIG. 22, descriptions below explain, on a basic example, the functions of the verifying chip 61 and the certifying chip 62 on the card 60 shown in FIG. 21. In FIG. 22, the steps (1)-(5) show the flow when the card is prepared by a card issuer. The steps (6)-(10) show when a user uses the card by means of a terminal device such as an ATM.

(1) A verifying chip 61 is prepared, in which card authentication verifying information "A" being artifact-metrics or an embossed hologram is stored. Because all artifact-metrics are different from each other, all of the verifying chips 61 having artifact-metrics are different from each other.

If the verifying chip as shown in FIG. 5 to FIG. 7 is prepared by using the data of 32 bits×32 bits=1024 bits (307 digits in decimal number) or more with the number of bits according to the method shown in FIG. 11 to FIG. 20, the probability of the existence of the same verifying chips can be very low and it is negligible. Because the embossed hologram has a three-dimensional structure, it is impossible to make optical duplication, and accordingly, it is very difficult to forge it.

(2) The information on the verifying chip 61 is read by analog or digital means. In order to accurately perform the reading when the card is used, it is desirable that the reading is performed after the verifying chip 61 is mounted on the card 60.

(3) The analog image of the verifying chip 61 thus read is digitized to the digital data "M". In a case where the data to be stored in the verifying chip 61 to be read is digital data, the digitization is unnecessary.

(4) The digital data "M" is encrypted, and the encrypted data "C" is obtained. As a cryptosystem, a secret-key cryptosystem and a public-key cryptosystem can be used.

A crypt key used in the secret-key cryptosystem is called a secret-key. In recent years, with the propagation of the public-key cryptosystem, more and more people refer a private-key used in the public-key cryptosystem as a secret-key. In this respect, it is also called a common-key to avoid the confusion.

According to "Modern Cryptography" published by the Institute of Electronics, Information and Communication Engineers (Japan), the process to obtain the enCrypted data "C" by Encrypting the Message "M" by using a crypt Key "K" is expressed as C=E (K, M), and the process to obtain decrypted data by Decrypting the enCrypted data by using a crypt Key "K" is expressed as M=D (K, C).

Here, following after the above, the process to Encrypt the digital data "M" by a Secret-key Ks of the secret-key cryptosystem to obtain the enCrypted data "Cs" is expressed as Cs=E (Ks, M), and the process to Decrypt the encrypted data "Cs" by the Secret-key Ks to obtain the digital data "M" is expressed as M=D (Ks, Cs).

The process to Encrypt the digital data "M" by a Pulic-key "Kp" of the public-key cryptosystem to obtain the encrypted data "Cp" is expressed as Cp=E (Kp, M). The process to Decrypt the encrypted data "Cp" by a priVate-key "Kv" to obtain digital data "M" is expressed as M=D (Kv, Cp). These are transmission of a crypt key.

The process to Encrypt the digital data "M" by the priVate-key "Kv" of the public-key cryptosystem to obtain the enCrypted data Cv is expressed as Cv=E (Kv, M). The process to Decrypt the encrypted data "Cv" by the public-key "Kp" to obtain the digital data "M" is expressed as M=D (Kp, Cv). These are the digital signature.

(5) The encrypted data "Cs", "Cp" or "Cv" are stored in a certifying chip 62, which is non-separably mounted on the card body 60. For the storage of the encrypted data, adequate means such as the optical reading and recording method, the magnetic recording, etc. for barcode or two-dimensional barcode, etc. may be adopted.

In a case where the card 60 is an IC card with an IC chip mounted on it, it is also possible to store the encrypted data in the IC chip. To be a non-separable structure, they are integrated or a method such as welding may be adopted. Also, the encrypted data may be recorded on the card itself instead of mounting the certifying chip on the card.

(6) When the card is used, the encrypted data "C" stored in the certifying chip 62 is read.

(7) The encrypted data "C" is decrypted by using a predetermined cryptography algorithm and the crypt key, and the decrypted data "M" is obtained.

(8) At the same time, information "A'" of the verifying chip 61 is read. As the reading means, camera is generally used, while a reading head or a scanner other than camera may be used.

(9) The information "A'" of the verifying chip thus read is digitized and the digital data "M'" is obtained.

(10) The decrypted data "M" is compared with the digitized data "M'". If these are equal to each other, it is judged that the combination of the verifying chip 61 and the certifying chip 62 is legitimate. If these are different from each other, it is judged that the combination of the verifying chip 61 and the certifying chip 62 is not legitimate, and the card is judged as illegitimate. Thus, the authenticity of the verifying chip 61 is certified by the certifying chip 62 which is togetherwith present on the card.

In this example, the data "M'" read from the verifying chip 61 is compared to the data "M" decrypted from the certifying chip 62. It may be possible that the encrypted data "C'" obtained by encrypting the data "M" read from the verifying chip 61 is compared to the encrypted data "C" read from the certifying chip 62.

The data on the certifying chip 62 is encrypted. In this cryptosystem, either of the secret-key (or the common-key) cryptosystem using a single crypt key and the public-key cryptosystem using two crypt keys can be adopted. In the public-key cryptosystem, a combination of the public-key and the private-key (the secret-key) or a combination of the private-key and the public-key may be adopted when used for the encryption and decryption.

When a user uses the card by means of a terminal device, the crypt key for decryption is used. The crypt key is stored within a server or within the terminal device. If it is so designed that the crypt key is stored within the server and when authentication verifying of the card is needed, the crypt key needed then, is delivered to the terminal device each time, it can be a method with high security on on-line basis. If the crypt key is stored within the terminal device, authentication verifying of the card can be executed only on the terminal device on off-line basis. However, if the terminal device is stolen, the crypt key is also stolen. If it is so designed that the crypt key is stored in a DRAM in the terminal device and the crypt key stored in DRAM will be lost when the power to the terminal device is cut off because the terminal device is destroyed or stolen, the stealing of the crypt key can be prevented.

Embodiment 2 of the Certifying Chip

When the data stored for confirming the authenticity of the card is transmitted from the host server to the terminal device and the authenticity is verified on the terminal device, or when the data of the card is read and transmitted to the server and the authenticity is verified on the server, the storage data volume in the server and the transmitting data volume become large because the digital data volume of the verifying chip 61 is large.

To cope with such the situation, if MD5 (Message Digest 5), which is the typical hash algorithm, or other hash algorithm such as SAH-1 (Secure Hash Algorithm-1) or SAH-2 is used, the data can be converted to the 16-byte hash value regardless of how large the data may be, and falsification of the original data is always reflected in the hash value. If utilizing these characteristics, the storage data volume in the server and the data transmission volume may not be so large. To alleviate the burden for encryption/decryption, hash algorithm is used.

Figure 23:
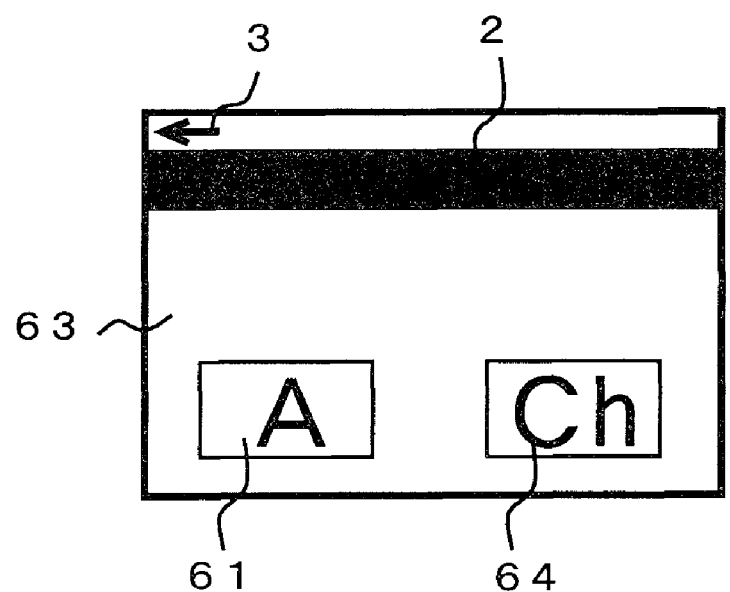
FIG. 23 shows another example of a card mounted with the verifying chip and the certifying chip.
Figure 24:
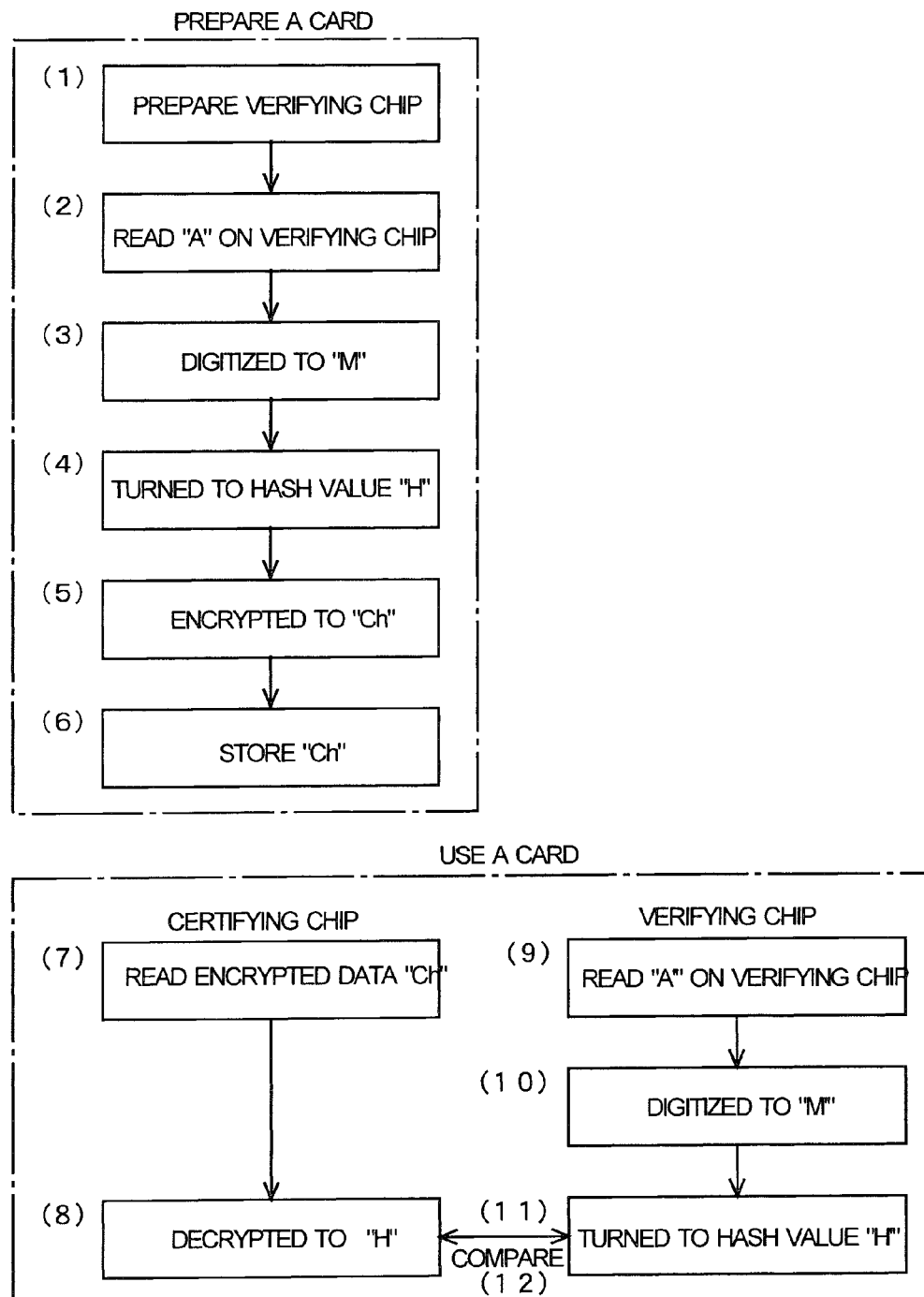
FIG. 24 is a flow chart to show a flow of authentication certifying of the card shown in FIG. 23.

FIG. 23 and FIG. 24 show an example of a card using the hash algorithm. FIG. 23 shows the card. FIG. 24 shows the functions of the verifying chip and the certifying chip.

On a card 63, there are provided a verifying chip 61 where card Authentication verifying information "A" such as artifact-metrics is stored; and a certifying chip 64 where the authentication verifying information "A" is digitized to the digitized data Message "M", turned to the hash value "H", and "H" is encrypted to the encrypted data "Ch" and is stored; and both are non-separably mounted on the card body. On the upper portion of the surface of the card 63, a magnetic stripe 2 and an arrow mark 3 are disposed. An IC chip may be used instead of the magnetic stripe 2 or together with it. The verifying chip 61 and the certifying chip 64 may be arranged at separate positions respectively as shown in FIG. 23 or these may be arranged adjacent to each other or may be united.

Referring to FIG. 24, descriptions below explain the functions of the verifying chip 61 and the certifying chip 64 on the card 63 shown in FIG. 23. In FIG. 24, the steps (1)-(6) show the flow of the preparation of the card by a card issuer. The steps (7)-(11) show the flow when a user uses the card by means of a terminal device such as an ATM.

(1) The verifying chip 61 is prepared, in which card authentication verifying information "A" being artifact-metrics or the embossed hologram is stored. Because all of the artifact-metrics are different from each other, all of the verifying chips 61 having the artifact-metrics are different from each other. In particular, it is impossible to duplicate the artifact-metrics having the three-dimensional arrangement, and it cannot be forged.

If the verifying chip as shown in FIG. 5 to FIG. 7 is prepared by using the data of 32 bits×32 bits=1024 bits (307 digits in decimal number) or more with the number of bits according to the method shown in FIG. 11 to FIG. 20, the probability of the existence of the same verifying chips can be very low and it is negligible. Because the embossed hologram has a three-dimensional structure, it is impossible to make optical duplication, and accordingly, it is very difficult to forge it.

(2) The information on the verifying chip 61 is read by analog or digital means. In order to accurately perform the reading when the card is used, it is desirable that the reading is performed after the verifying chip 61 is mounted on the card 63.

(3) The analog image of the verifying chip 61 thus read is digitized to the digital data "M". In a case where the data to be stored in the verifying chip 61 to be read is digital data, digitization is unnecessary.

(4) The digital data "M" is turned to the hash value "H". The hash value obtained when using the MD5 algorithm as widely used, is of 16 bytes (=128 bits).

(5) The hash value "H" is encrypted, and the encrypted data "Ch" is obtained. As the cryptosystem, the secret-key cryptosystem and the public-key cryptosystem can be used.

(6) The encrypted data "Ch" is stored in the certifying chip 64, which is non-separably mounted on the card body 63. For the storage of the encrypted data, adequate means such as the optical reading and recording method, the magnetic recording, etc. for barcode or two-dimensional barcode may be adopted.

In a case where the card 63 is an IC card with an IC chip mounted on it, it is also possible to store the encrypted data in the IC chip. It may be integrated as a non-separable structure or a method such as welding may be adopted. The data may be recorded on the card itself instead of mounting the chip.

(7) When the card is used, the encrypted data "Ch" stored in the certifying chip 64 is read.

(8) The encrypted data "Ch" is decrypted by using a predetermined cryptography algorithm and the crypt key, and a decrypted data "H" is obtained.

(9) At the same time, information "A'" of the authentication verifying chip 61 is read.

As the reading means, camera is generally used, while a reading head or a scanner other than the camera may be used.

(10) The information "A'" of the verifying chip thus read is digitized, and the digital data "M'" is obtained.

(11) The digital data "M'" is turned to hash value and the hash value "H'" is obtained.

(12) The decrypted data "H" is compared with the hash value "H'". If these are equal to each other, it is judged that the combination of the verifying chip 61 and the certifying chip 64 is legitimate. If these are different from each other, it is judged that the combination of the verifying chip 61 and the certifying chip 64 is not legitimate, and the card is judged as illegitimate. In this way, the authenticity of the verifying chip 61 is certified by the certifying chip 64, which is together with present on the card.

In this example, the hash value "H" obtained by the hashing of the data "M" read from the verifying chip 61 is compared to the hash value "H" decrypted from the encrypted hash value "Ch" read from the certifying chip 64. It may be possible that the encrypted hash value "Ch'" obtained by encrypting the hash value "H'" by hashing the data "M'" read from the verifying chip 61 is compared to the encrypted data "Ch" read from the certifying chip 64.

The cryptosystem and the method to use and manage crypt keys used in this embodiment are not different from the case of the Embodiment 1 of the certifying chip, and new description is not given here.

Embodiment 3 of the Certifying Chip

There may be the cases where the verifying chip is destroyed or stained and the authentication verifying information cannot be read. In such the case, the card cannot be used even when it is legitimate. The following describes the arrangement to cope with such the situation.

Figure 25:
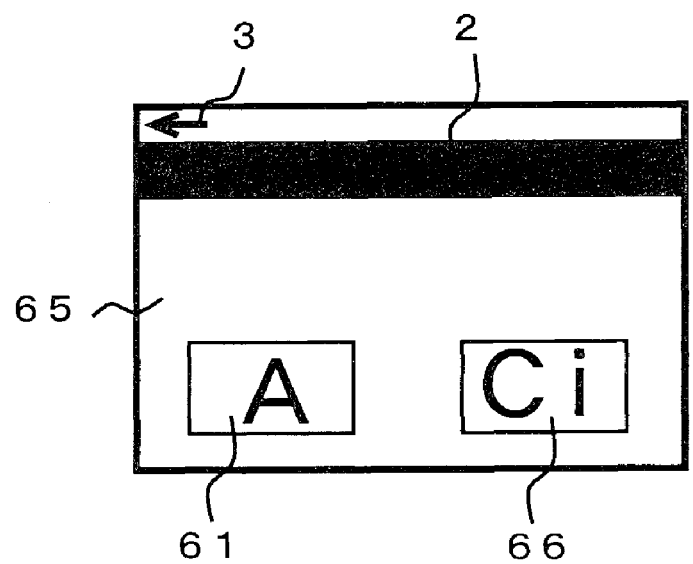
FIG. 25 is still another example of a card mounted with the verifying chip and the certifying chip.
Figure 26:
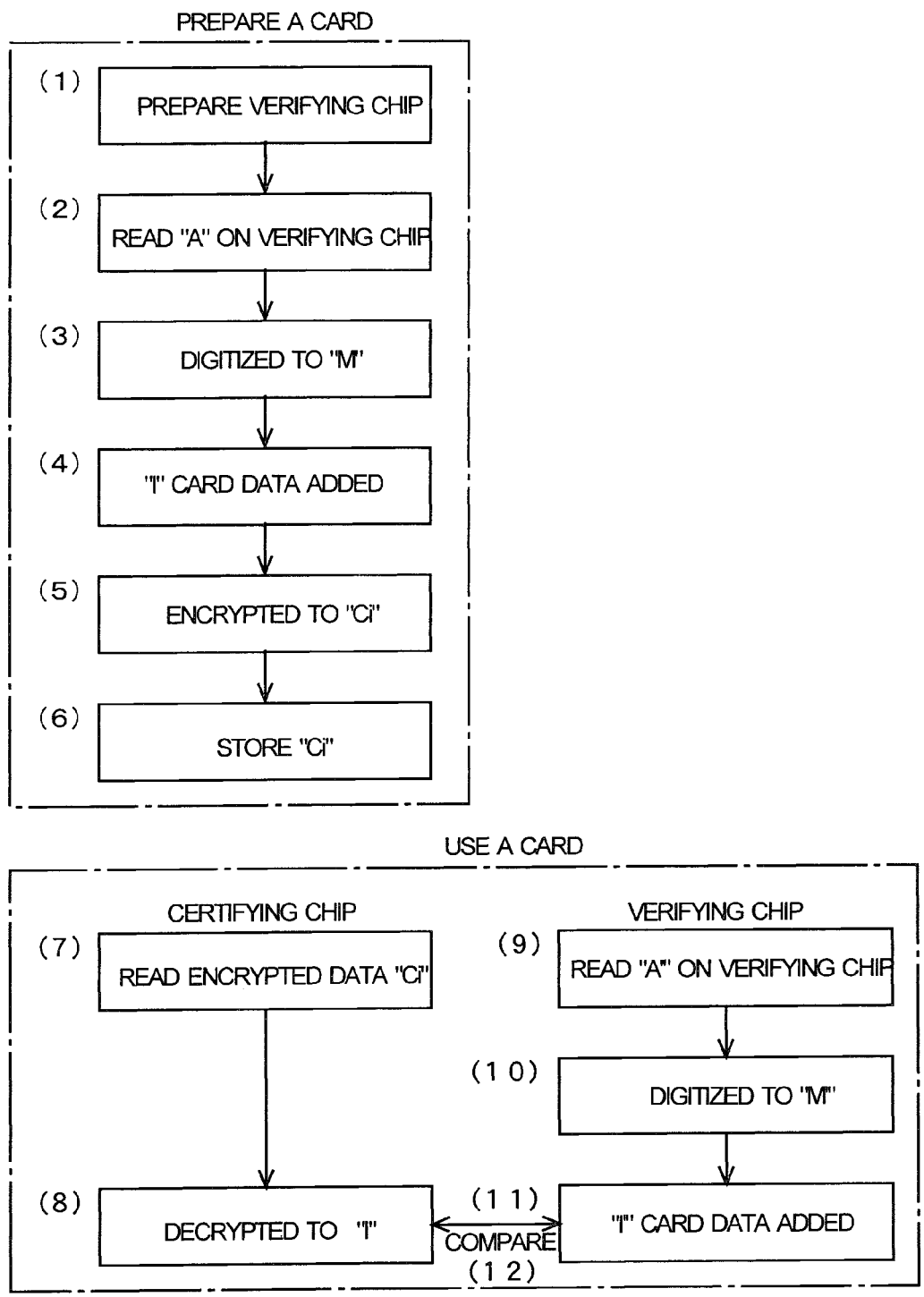
FIG. 26 is a flow chart to show a flow of authentication certifying of the card shown in FIG. 25.

FIG. 25 and FIG. 26 show an example of a card using the ID of the card. FIG. 25 illustrates the card. FIG. 26 shows the functions of the verifying chip and the certifying chip shown in FIG. 25.

On a card 65, there are provided a verifying chip 61 where card Authentication verifying information "A" such as artifact-metrics is stored; and a certifying chip 66 where the authentication verifying information "A" is digitized to the digitized data Message "M", turned to ID-added data "I" by adding data such as the ID of the card, and "I" is encrypted to the encrypted data "Ci" and is stored; and both are non-separably mounted on the card body. On the upper portion of the surface of the card 65, a magnetic stripe 2 and an arrow mark 3 are disposed. An IC chip may be used instead of the magnetic stripe 2 or together with it. The verifying chip 61 and the certifying chip 66 may be arranged at separate positions respectively as shown in FIG. 25 or these may be arranged adjacent to each other or may be united.

Referring to FIG. 26, descriptions below explain the functions of the verifying chip 61 and the certifying chip 66 on the card 65 shown in FIG. 25. In FIG. 26, the steps (1)-(6) show the flow when the card is prepared by a card issuer. The steps (7)-(11) show when a user uses the card by means of a terminal device such as an ATM.

(1) A verifying chip 61 is prepared, in which card authentication verifying information "A" being artifact-metrics or an embossed hologram is stored.

Because all artifact-metrics are different from each other, all of the verifying chips 61 having artifact-metrics are different from each other. In particular, it is impossible to duplicate the artifact-metrics with three-dimensional arrangement, and it cannot be forged.

If the verifying chip as shown in FIG. 5 to FIG. 7 is prepared by using the data of 32 bits×32 bits=1024 bits (307 digits in decimal number) or more with the number of bits according to the method shown in FIG. 11 to FIG. 20, the probability of the existence of the same verifying chips can be very low and it is negligible. Because the embossed hologram has a three-dimensional structure, it is impossible to make optical duplication, and accordingly, it is very difficult to forge it.

(2) The information on the verifying chip 61 is read by analog or digital means. In order to accurately perform the reading when the card is used, it is desirable that the reading is performed after the verifying chip 61 is mounted on the card 65.

(3) The analog image of the verifying chip 61 thus read is digitized to the digital data "M". In a case where the data to be stored in the verifying chip 61 to be read is digital data, the digitization is unnecessary.

(4) The data such as the ID of the card is added to the digital data "M" and ID-added data "I" is obtained.

(5) The ID-added data "I" is encrypted and encrypted data "Ci" is obtained. For the cryptosystem, a secret-key cryptosystem or a public-key cryptosystem can be used.

(6) The encrypted data "Ci" is stored in a certifying chip 66, which is non-separably mounted on the card body 65. For the storage of the encrypted data, adequate means such as the optical reading and recording method, the magnetic recording for barcode or two-dimensional barcode, etc. may be adopted.

In a case where the card 65 is an IC card with an IC chip mounted on it, it is also possible to store the encrypted data in the IC chip. It may be integrated as a non-separable structure or a method such as welding may be adopted. Also, the encrypted data may be recorded on the card itself instead of mounting the chip on the card.

(7) When the card is used, the encrypted data "Ci" stored in the certifying chip 66 is read.

(8) The encrypted data "Ci" is decrypted by using a predetermined cryptography algorithm and the crypt key, and a decrypted data "I" is obtained.

(9) At the same time, information "A'" of the verifying chip 61 is read. As the reading means, camera is generally used, while a reading head or a scanner other than the camera may be used.

(10) The information "A'" of the verifying chip 61 thus read is digitized and the digital data "M'" is obtained.

(11) The data such as the ID of the card is added to the digital data "M'", and ID-added data "I'" is obtained.

(12) The decrypted data "I" is compared with the ID-added data "I'". If these are equal to each other, it is judged that the combination of the verifying chip 61 and the certifying chip 66 is legitimate. If these are different from each other, it is judged that the combination of the verifying chip 61 and the certifying chip 66 is not legitimate, and the card is judged as illegitimate.

In this way, the authenticity of the verifying chip 61 is certified by the certifying chip 66 which is togetherwith present on the card.

The data recorded on the certifying chip 66 is the encrypted data which is obtained by adding the ID to the data based on the data of the verifying chip 61 and is encrypted. In order to confirm the authenticity of the verifying chip 61, it is necessary to add the ID to the data obtained from the certifying chip 66 prior to the comparison of the data. By keeping this ID in secret, any one who does not know this ID cannot cryptanalyze to know the crypt key.

In this example, the information "A'" read from the verifying chip 61 is digitized to the digital data "M'", further added the card information, and thus obtained data "I'" is compared to the data "I" which is obtained by decrypting the encrypted data "Ci" read from the certifying chip 66. It may be possible that the digital data "M" which is obtained by removing the card information from the data "I" obtained by decrypting the data "Ci" read from the certifying chip 66 is compared to the digital data "M'" obtained by digitizing the information "A'" read from the verifying chip 61.

The cryptosystem and the method to use and manage crypt keys used in this embodiment are not different from the case of the Embodiment 1 of the certifying chip, and new description is not given here.

Embodiment 4 of the Certifying Chip

The card where both the verifying chip and the certifying chip are present is under the control of the user. In the verifying chip, the authentication verifying information subject to the encryption is present not in secret. In the certifying chip, encrypted data of the authentication verifying information is present. Then, if the card is given into the hand of any one who has malicious intention or if the user has malicious intention, the encryption may be cryptanalyzed and the crypt key may become known. Descriptions below explain arrangements for preventing such the situation.

Figure 27:
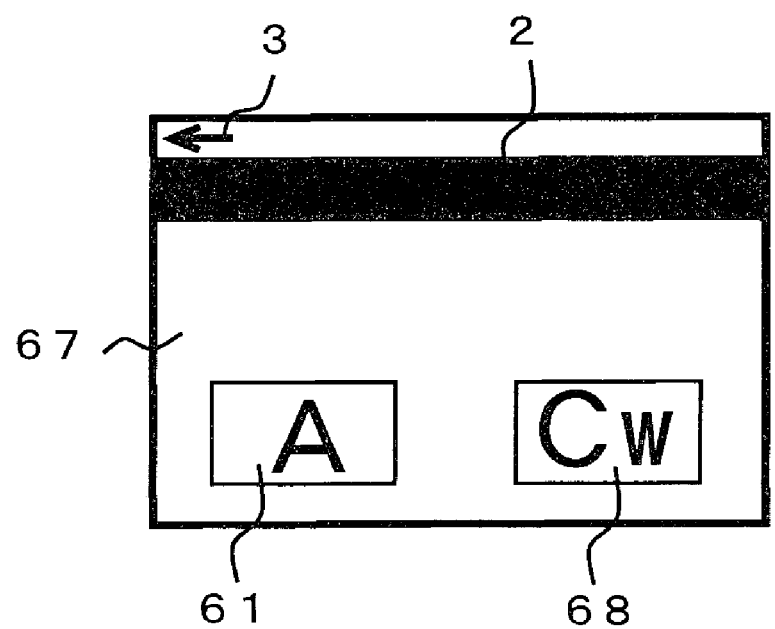
FIG. 27 shows still another example of a card mounted with the verifying chip and the certifying chip.
Figure 28:
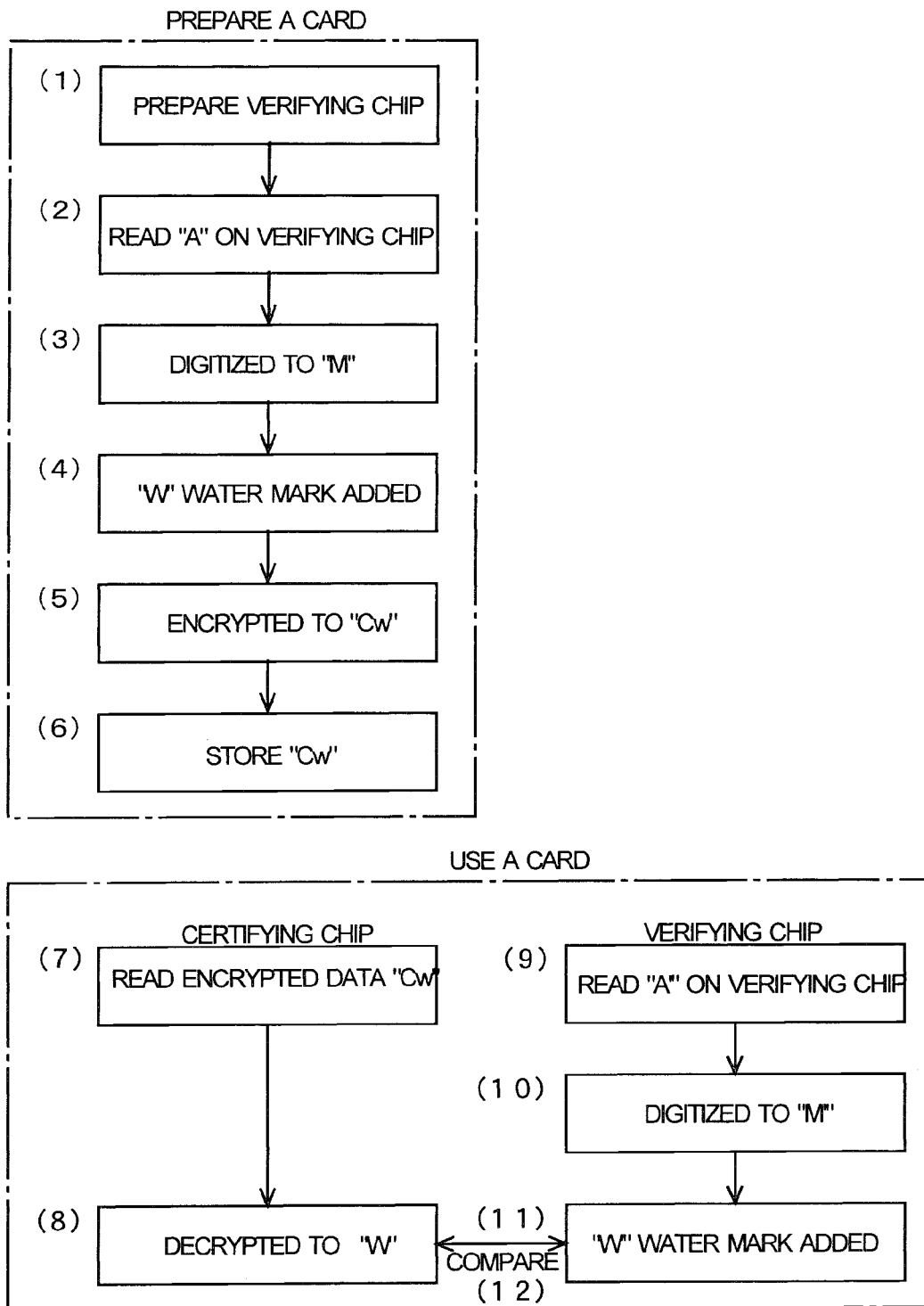
FIG. 28 is a flow chart to show a flow of authentication certifying of the card shown in FIG. 27.

FIG. 27 and FIG. 28 show an example of a card using the electronic watermark. FIG. 27 illustrates the card. FIG. 28 shows the functions of the verifying chip and the certifying chip shown in FIG. 27.

On a card 67, there are provided the verifying chip 61 where card Authentication verifying information "A" such as artifact-metrics is stored; and the certifying chip 68 where the authentication verifying information "A" is digitized to the digitized data Message "M", turned to data with electronic watermark "W" by adding the electronic watermark to "M", and is encrypted to encrypted data "Cw" and is stored; and both are non-separably mounted on the card body. On the upper portion of the surface of the card 67, a magnetic stripe 2 and an arrow mark 3 are disposed. An IC chip may be used instead of the magnetic stripe 2 or together with it. The verifying chip 61 and the certifying chip 68 may be arranged at separate positions respectively as shown in FIG. 27 or these may be arranged adjacent to each other or united.

Referring to FIG. 28, descriptions below explain the functions of the verifying chip 61 and the certifying chip 68 on the card 67 shown in FIG. 27. In FIG. 28, the steps (1)-(6) show the flow when the card is prepared by a card issuer. The steps (7)-(11) show when a user uses the card by means of a terminal device such as an ATM.

(1) A verifying chip 61 is prepared, in which card authentication verifying information "A" being artifact-metrics or an embossed hologram is stored.

Because all artifact-metrics are different from each other, all of the verifying chips 61 having artifact-metrics are different from each other. In particular, it is impossible to duplicate artifact-metrics with three-dimensional arrangement, and it cannot be forged. If the verifying chip as shown in FIG. 5 to FIG. 7 is prepared by using the data of 32 bits×32 bits=1024 bits (307 digits in decimal number) or more with the number of bits according to the method shown in FIG. 11 to FIG. 20, the probability of the existence of the same verifying chips can be very low and it is negligible. Because the embossed hologram has a three-dimensional structure, it is impossible to make optical duplication, and accordingly, it is very difficult to forge it.

(2) The information on the verifying chip 61 is read by analog or digital means. In order to accurately perform the reading when the card is used, it is desirable that the reading is performed after the verifying chip 61 is mounted on the card 67.

(3) The analog image of the verifying chip 61 thus read is digitized to the digital data "M". In a case where the data to be stored in the verifying chip 61 to be read is digital data, the digitization is unnecessary.

(4) Electronic watermark is added to the digital data "M", and data added the electronic watermark "W" is obtained.

(5) The electronic-watermark-added data "W" is encrypted and the encrypted data "Cw" is obtained.

(6) The encrypted data "Cw" is stored in a certifying chip 67, which is non-separably mounted on the card body 55. For the storage of the encrypted data, adequate means such as the optical reading and recording method, the magnetic recording, etc. for barcode or two-dimensional barcode, etc. may be adopted.

In a case where the card 67 is an IC card with an IC chip mounted on it, it is also possible to store the encrypted data in the IC chip. Forming a non-separable structure or a method such as welding may be adopted. Also, the encrypted data may be recorded on the card itself instead of mounting the certifying chip on the card.

(7) When the card is used, the encrypted data "Cw" stored in the certifying chip 68 is read.

(8) The encrypted data "Cw" is decrypted by using a predetermined cryptography algorithm and a crypt key, and the decrypted data "W" is obtained.

(9) At the same time, information "A'" of the verifying chip 61 is read. As the reading means, camera is generally used, while a reading head or a scanner other than the camera may be used.

(10) The information "A'" of the verifying chip thus read is digitized, and the digital data "M'" is obtained.

(11) Electronic watermark is added to the digital data "M'", and the data with the electronic watermark "W'" is obtained.

The decrypted data "W" is compared with the digital data with the electronic watermark "W'". If these are equal to each other, it is judged that the combination of the verifying chip 61 and the certifying chip 68 is legitimate. If these are different from each other, it is judged that the combination of the verifying chip 61 and the certifying chip 68 is not legitimate.

In this way, the authenticity of the verifying chip 61 is certified by the certifying chip 68 which is togetherwith present on the card.

The data recorded on the certifying chip 68 is the encrypted data obtained by encrypting the data which is added the electronic watermark to the data based on the information of the verifying chip 61. In order to confirm the authenticity of the verifying chip 61, it is necessary to add the electronic watermark to the data obtained from the verifying chip 61 prior to the data comparison. By keeping this electronic watermark in secret, any one who does not know this electronic watermark cannot cryptanalyze to know the crypt key.

In this example, the information "A'" read from the verifying chip 61 is digitized to the digital data "M'" and is added the electronic watermark, and thus obtained data "W'" is compared to the data "W" which is obtained by decrypting the encrypted data "Cw" read from the certifying chip 68. It may be possible that the digital data "M" which is obtained by removing electronic watermark from the data "W" obtained by decrypting the data "Cw" read from the certifying chip 68 is compared to the digital data "M'" obtained by digitizing the information "A'" read from the verifying chip 61.

The cryptosystem, the method to use and manage crypt keys used in this embodiment are not different from the case of the Embodiment 1 of the certifying chip, and new description is not given here.

Embodiment 5 of the Certifying Chip

In the examples of the certifying chip as described above, the basic arrangement is shown in the Embodiment 1, hash algorithm is added thereto in the Embodiment 2, the ID of the card or the like is added in the Embodiment 3, and the electronic watermark is added in the Embodiment 4. As a result, it becomes difficult to forge. In the technique added with these features, it is also possible not only to simply add only one of these features but also to combine several of them. That is, the hash algorithm may be combined with ID of the card or the like, the hash algorithm may be combined with the electronic watermark. ID of the card or the like may be combined with the electronic watermark, or the hash algorithm and ID of the card or the like may be combined with the electronic watermark.

Descriptions below explain the flow on the card authentication verifying process.

Embodiment 1 of the Processing Flow

Figure 29:
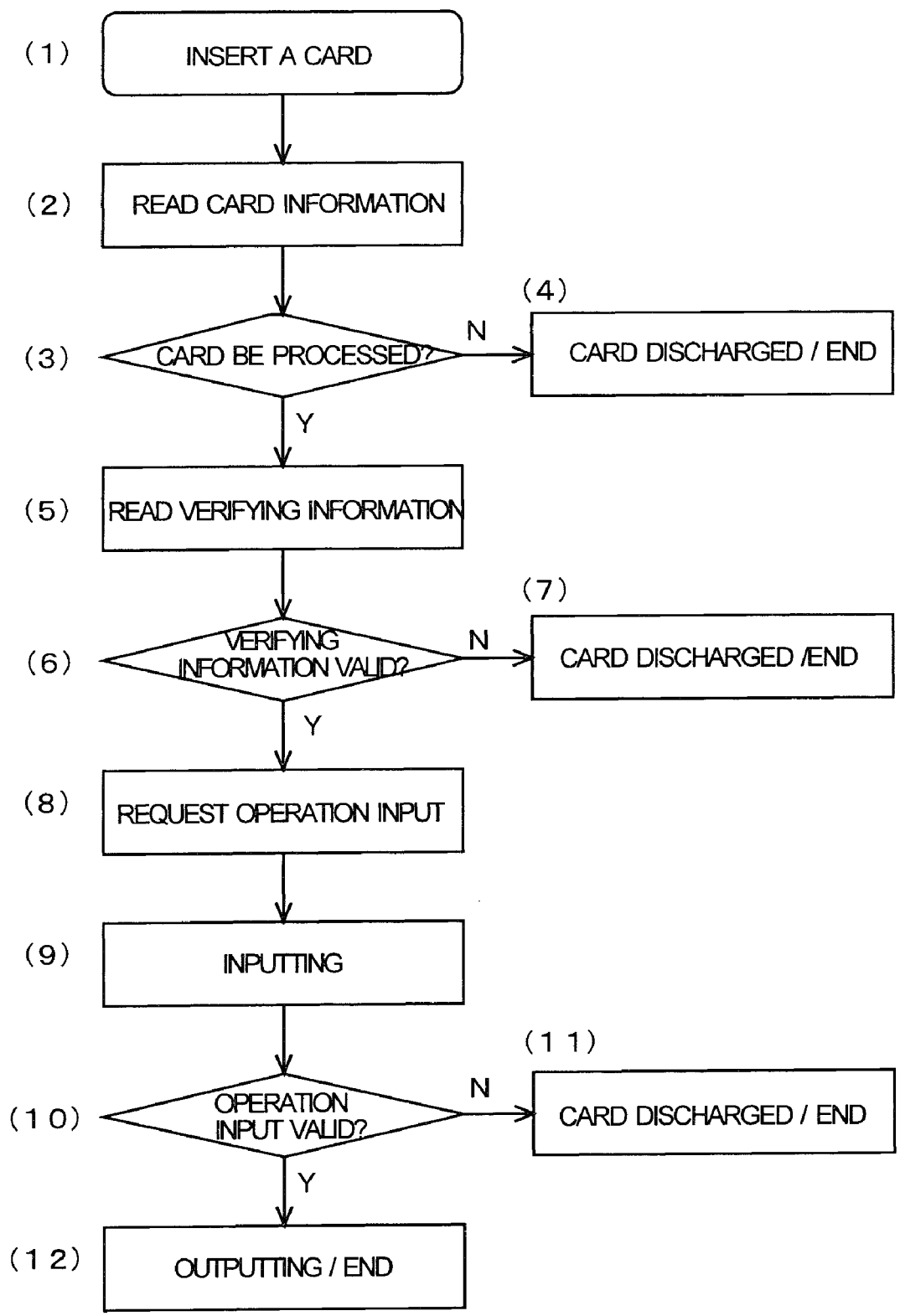
FIG. 29 is a flow chart to show a flow of processing a cash card according to the present invention.

Referring to FIG. 29, the Embodiment 1 of the flow of card authentication verifying processing is described.

(1) A card user inserts a cash card into a card slot of a terminal device such as an ATM by setting the portion of the card marked with an arrow at the foremost position, the sensor at the card slot senses it, and the card is taken into the device.

(2) When the card is taken into the device, the terminal device reads the card information from the magnetic recording portion of the card.

(3) The terminal device judges whether the inserted card is a valid card which can be processed by the terminal device or not.

(4) If it is not confirmed that the card can be processed by the device from the card information thus read, or if the information of the card cannot be read because the card is broken or stained even though it is a valid card, the terminal device judges that it is an illegitimate card which cannot be processed and discharges the card.

(5) The terminal device reads the authentication verifying data from the verifying chip by mechanical scanning using the movement of the card when the card is taken into the device or under the stopped condition after the card is taken in.

(6) The terminal device judges whether the card authentication verifying data thus read is valid or not.

(7) In a case where the terminal device judges that the card authentication verifying data is not valid, it is judged that the inserted card is not a valid card. Then, the card is discharged from the terminal device, and the processing is terminated.

(8) In a case where the terminal device judges that the card authentication verifying data is valid, it instructs the user to perform further input operations, for example, input of the amount to draw.

(9) The user follows the instruction and performs the input operation such as the inputting of the amount to be paid.

(10) The host computer judges whether the content of the input operation such as the amount to be paid is adequate or not.

(11) If the host computer judges that the content of the input operation is inadequate, for example, the balance short in the deposit, the card is discharged from the device, and the processing is terminated.

(12) When the host computer judges that the content of the input operation such as the amount to be paid is adequate, the output operation such as paying of the amount is performed. Then, the card is discharged from the terminal device and the processing is terminated.

Embodiment 2 of the Processing Flow

Figure 30:
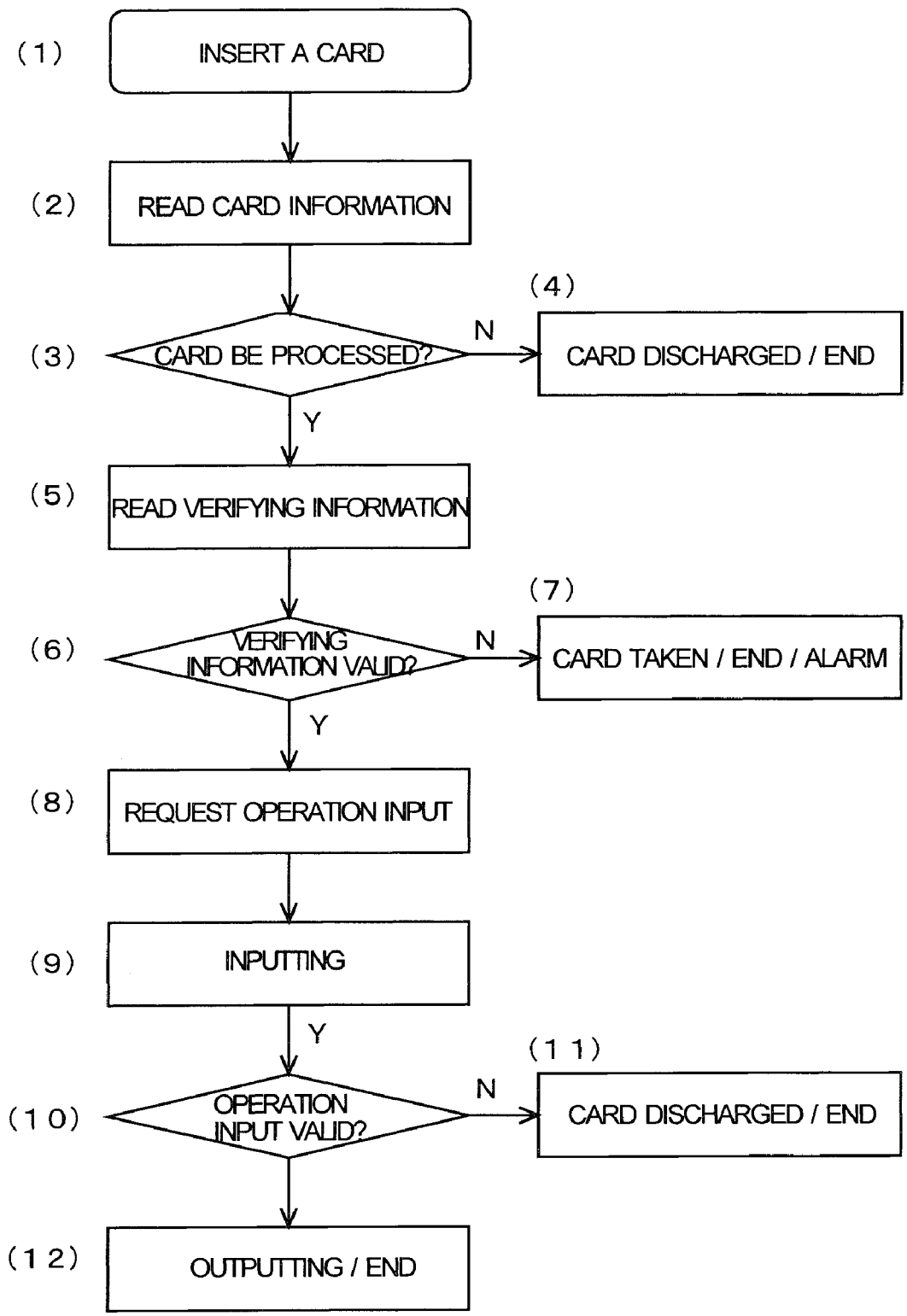
FIG. 30 is another flow chart to show a flow of processing a cash card according to the present invention.

Referring to FIG. 30, Embodiment 2 of the flow of the card authentication verifying process is described.

In the flow of the card authentication verifying process, if the card authentication verifying data is not valid, the card is discharged from the terminal device in the Embodiment 1. In the Embodiment 2, if the authentication verifying data is not valid, the card is taken into the terminal device, and an alarm is given. In so doing, it can be easy to dig up the illegitimate card.

(1) When a card user inserts a cash card into a card slot of a terminal device such as an ATM by setting the portion of the card marked with an arrow at the foremost position, the sensor at the card slot senses it, and the card is taken into the device.

(2) When the card is taken into the device, the terminal device reads the card information from the magnetic recording portion of the card.

(3) The terminal device judges whether the inserted card is a valid card which can be processed by the terminal device or not.

(4) If it is not confirmed that the card can be processed by the device from the card information thus read, or if the information of the card cannot be read because the card is broken or stained even though it is a valid card, the terminal device judges that it is an illegitimate card which cannot be processed and discharges the card.

(5) The terminal device reads the authentication verifying data from the verifying chip by mechanical scanning using the movement of the card when the card is taken into the device or under the stopped condition after the card is taken in.

(6) The terminal device judges whether the card authentication verifying data thus read is valid or not.

(7) In a case where the terminal device judges that the card authentication verifying data is not valid, it is judged that the inserted card is not a valid card. Then, the card is held in the device, and the alarm is given.

It may be possible that the alarm is issued only at a place remote from the terminal device, and a message of operation failure is displayed on the terminal device. This makes it easy to have the user of the illegitimate card under control.

(8) In a case where the terminal device judges that the card authentication verifying data is valid, it instructs the user to perform further input operations, for example, input of the amount to draw.

(9) The user follows the instruction and performs the input operation such as the inputting of the amount to be paid.

(10) The host computer judges whether the content of the input operation such as the amount to be paid is adequate or not.

(11) If the host computer judges that the content of the input operation is inadequate, for example, the balance short in the deposit, the card is discharged from the device, and the processing is terminated.

(12) When the host computer judges that the content of the input operation such as the amount to be paid is adequate, output operation such as paying of the amount is performed. Then, the card is discharged from the terminal device and the processing is terminated.

Embodiment 3 of the Processing Flow

Figure 31:
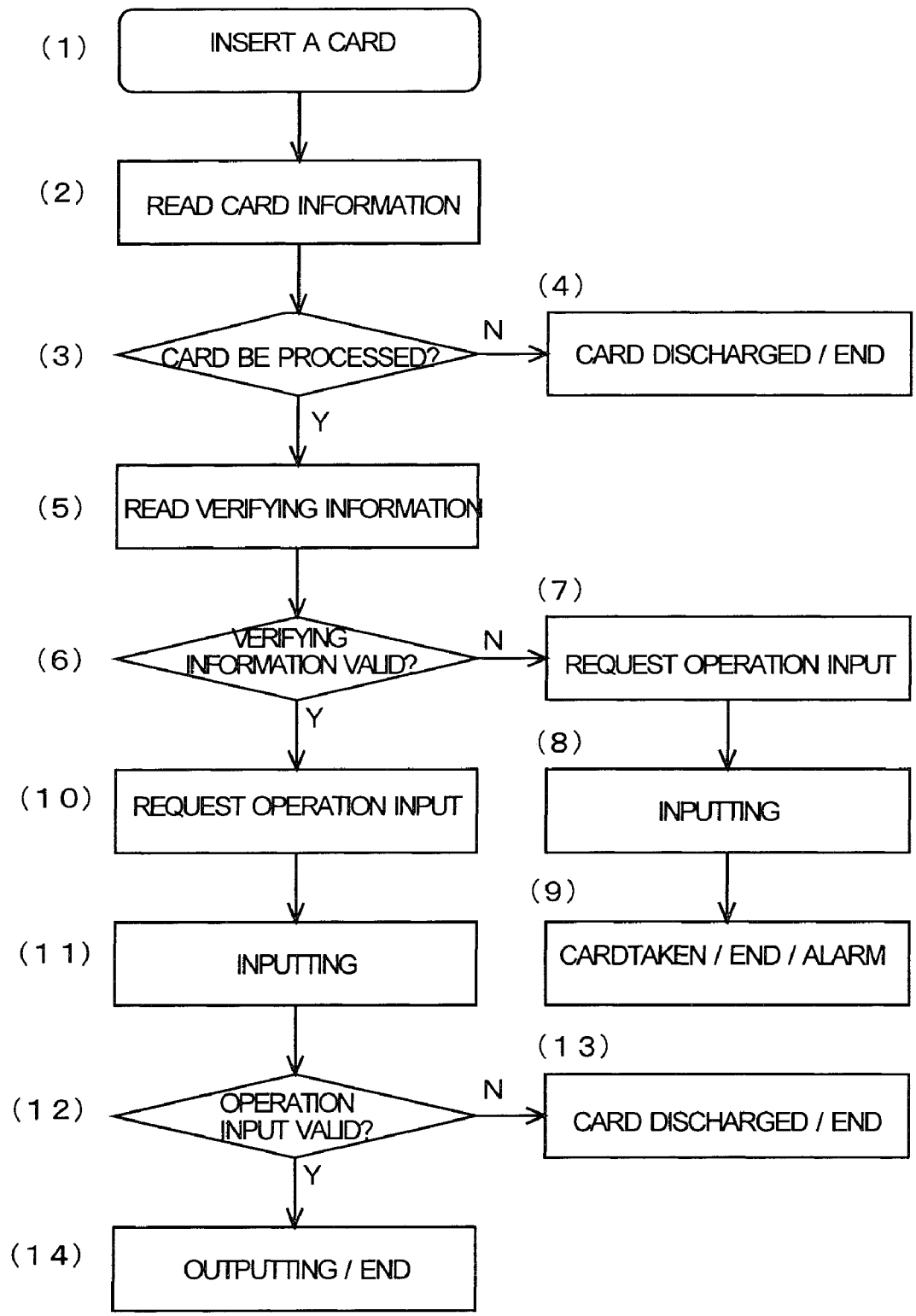
FIG. 31 is still another flow chart to show a flow of processing a cash card according to the present invention.

Referring to FIG. 31, Embodiment 3 of the flow of the card authentication verifying process is described.

In the flow of the card authentication verifying process, while if the card authentication verifying data is not valid, the card is quickly taken into the terminal device and an alarm is given in the Embodiment 2, if the authentication verifying data is not valid, the process to use the card continues in the Embodiment 3. In so doing, it can be easy to dig up the use of the illegitimate card.

(1) A card user inserts a cash card into a card slot of a terminal device such as an ATM by setting the portion of the card marked with an arrow at the foremost position. Then, the sensor at the card slot senses it, and the card is taken into the device.

(2) When the card is taken into the device, the terminal device reads the card information from the magnetic recording portion of the card.

(3) The terminal device judges whether the inserted card is a valid card which can be processed by the terminal device or not.

(4) If it is not confirmed that the card can be processed by the device from the card information thus read, or if the information of the card cannot be read because the card is broken or stained even though it is a valid card, the terminal device judges that it is an illegitimate card which cannot be processed and discharges the card.

(5) The terminal device reads the authentication verifying data from the verifying chip by mechanical scanning using the movement of the card when the card is taken into the device or under the stopped condition after the card is taken in.

(6) The terminal device judges whether the card authentication verifying data thus read is valid or not.

(7) In a case where the terminal device judges that the card authentication verifying data is not valid, it instructs the user to perform further input operations, for example, input of the amount to draw.

(8) The user follows the instruction and performs the input operation such as the inputting of the amount to be paid.

(9) Then, the card is held in the terminal device, and an alarm is given.

It may be arranged that the alarm is issued only at a place remote from the terminal device, and a message of operation failure is displayed on the terminal device. This makes it easy to have the user of the illegitimate card under control.

(10) In a case where the terminal device judges that card authentication verifying data is valid, it instructs the user to perform further input operations such as the input of the amount to draw.

(11) The user follows the instruction and performs the input operation such as the input of the amount to be paid.

(12) The host computer judges whether the content of the input operation such as the amount to be paid is adequate or not.

(14) If the host computer judges that the content of the input operation is inadequate, for example, the balance short in the deposit, the card is discharged from the device, and the processing is terminated.

With the arrangement as described above, the time, during which the user who uses the illegitimate card uses the terminal device, can be extended. This means not only that gives longer time for capturing the card user, but also that makes it possible to obtain further evidence such as the user's fingerprints from the input operation.

If a contact-type touch switch is adopted, this makes the taking of fingerprints much easier.

INDUSTRIAL APPLICABILITY

The card with the card authentication verifying chip and the card authentication certifying chip as described above can be adopted in the applications such as bank cash cards, credit cards, prepaid cards, membership cards, securities, ID cards, admission allowance and other types of certificate.

The invention claimed is:

1. An object for authentication verification, for which authentication verification is needed,
   wherein an authentication verifying chip provided with non-duplicable information for identifying said object and with a mark for reading position alignment is non-separably added to said object,
   wherein said non-duplicable information is based on using lights of a plurality of wavelengths, and is obtained by chance.

2. An object for authentication verification according to claim 1, wherein said non-duplicable information, which is based on using lights of a plurality of wavelengths obtained by chance, for identifying said object is an artifact-metrics pattern.

3. An object for authentication verification according to claim 2, wherein said artifact-metrics pattern comprises an embossed hologram.

4. An object for authentication verification according to claim 2, wherein said artifact-metrics pattern comprises fluorescent substance particles.

5. An object for authentication verification according to claim 1, wherein said non-duplicable information, which is based on using a plurality of wavelengths obtained by chance, for identifying said object is an artificial pattern disposed based on true random numbers.

6. An object for authentication verification according to claim 5, wherein said artificial pattern disposed based on true random numbers comprises an embossed hologram.

7. An object for authentication verification according to claim 5, wherein said artificial pattern disposed based on true random numbers comprises fluorescent substance particles.

8. An object for authentication verification according to claim 5, wherein said artificial pattern disposed based on true random numbers is digital data arranged in a matrix form and said digital data is based on binary random numbers.

9. An object for authentication verification according to claim 8, wherein said artificial pattern disposed based on true random numbers is a part of digital data arranged in a matrix form.

10. An object for authentication verification according to claim 1, wherein said mark for reading position alignment provided is one.

11. An object for authentication verification according to claim 1, wherein a plurality of said marks for reading position alignment are provided.

12. An object for authentication verification according to claim 1, wherein a line to start the reading, a line to finish the reading and a line to indicate the end portion are provided.

13. An object for authentication verification according to claim 10, 11 or 12, wherein a mark for synchronization signal is further provided.

14. An object for authentication verification according to claim 1, wherein a plurality of said marks for reading position alignment are provided.

15. An object for authentication verification, for which authentication verification is needed, wherein an authentication verifying chip provided with non-duplicable information for identifying said object and with a mark for reading position alignment and information for certifying the authenticity of said verifying chip are added non-separably to said object,
   in which said non-duplicable information is based on using lights of a plurality of wavelengths, and is obtained by chance.

16. An object for authentication verification according to claim 15, wherein said authentication verifying chip provided with said non-duplicable information, which is based on using lights of a plurality of wavelengths obtained by chance, for identifying said object and with the mark for reading position alignment, and said information for certifying the authenticity of said verifying chip are added at different positions.

17. An object for authentication verification according to claim 15, wherein said authentication verifying chip provided with said non-duplicable information, which is based on using a plurality of wavelengths obtained by chance, for identifying said object and with the mark for reading position alignment, and said information for certifying the authenticity of said verifying chip are added at the same position.

18. An object for authentication verification according to claim 15, 16 or 17, wherein said non-duplicable information, which is based on using a plurality of wavelengths obtained by chance, for identifying said object is an artifact-metrics pattern.

19. An object for authentication verification according to claim 18, wherein said artifact-metrics pattern comprises an embossed hologram.

20. An object for authentication verification according to claim 18, wherein said artifact-metrics pattern comprises fluorescent substance particles.

21. An object for authentication verification according to claim 15, wherein said non-duplicable information, which is based on using a plurality of wavelengths obtained by chance, for identifying said object is an artificial pattern disposed based on true random numbers.

22. An object for authentication verification according to claim 21, wherein said artificial pattern disposed based on true random numbers comprises an embossed hologram.

23. An object for authentication verification according to claim 21, wherein said artificial pattern disposed based on true random numbers comprises fluorescent substance particles.

24. An object for authentication verification according to claim 21, wherein said artificial pattern disposed based on true random numbers is digital data arranged in a matrix form and said digital data is based on binary random numbers.

25. An object for authentication verification according to claim 21, wherein said artificial pattern disposed based on true random numbers is a part of digital data arranged in a matrix form.

26. An object for authentication verification according to claim 15, wherein said mark for reading position alignment provided is one.

27. An object for authentication verification according to claim 15, wherein a line to start the reading, a line to finish the reading and a line to indicate the end portion are provided.

28. An object for authentication verification according to claim 26, 14 or 27, wherein a mark for synchronization signal is further provided.

29. An object for authentication verification according to claim 15, wherein said information for certifying the authenticity of said verifying chip is encrypted data obtained in accordance with said non-duplicable information, which is based on using a plurality of wavelengths obtained by chance, for identifying said object.

30. An object for authentication verification according to claim 15, wherein said encrypted data is encrypted data obtained by encrypting hash value of said non-duplicable information, which is based on using a plurality of wavelengths obtained by chance, for identifying said object.

31. An object for authentication verification according to claim 15, wherein said encrypted data is encrypted data obtained by encrypting the information consisting of said non-duplicable information, which is based on using a plurality of wavelengths obtained by chance, for identifying said object and identification information of said object.

32. An object for authentication verification according to claim 16, wherein said encrypted data is encrypted data obtained by encrypting the information consisting of said non-duplicable information, which is based on using a plurality of wavelengths obtained by chance, for identifying said object and an electronic watermark.

33. An object for authentication verification according to claim 29, 30, 31 or 32, wherein said encrypted data is encrypted by using a common-key of a common-key cryptosystem under the control of an issuer of said object.

34. An object for authentication verification according to claim 29, 30, 31 or 32, wherein said encrypted data is encrypted by using a public-key of a public-key cryptosystem under the control of an issuer of said object.

35. An object for authentication verification according to claim 29, 30, 31 or 32, wherein said encrypted data is encrypted by using a secret-key of a public-key cryptosystem under the control of an issuer of said object.

36. An authentication verifying system for verifying authenticity of an object, wherein an authentication verifying chip provided with non-duplicable information for identifying said object and with a mark for reading position alignment, and a chip for certifying the authenticity of said object are added non-separably to said object,
   in which said non-duplicable information is based on using lights of a plurality of wavelengths, and is obtained by chance,
   whereby said objection is judged to be authentic by comparing said authentication verifying chip with said certifying chip.

37. An authentication verifying system according to claim 36, wherein said non-duplicable information, which is based on using lights of a plurality of wavelengths obtained by chance for identifying said object is an artifact-metrics pattern.

38. An authentication verifying system according to claim 36, wherein said non-duplicable information, which is based on using a plurality of wavelengths obtained by chance for identifying said object is an artificial pattern disposed based on true random numbers.

39. An authentication verifying system according to claim 36, wherein said information for certifying the authenticity of said authentication verifying chip is encrypted data obtained according to said non-duplicable information, which is based on using a plurality of wavelengths obtained by chance for identifying said object.

40. An authentication verifying system according to claim 39, wherein said encrypted data is encrypted data obtained by encrypting hash value of said non-duplicable information, which is based on using a plurality of wavelengths obtained by chance, for identifying said object.

41. An authentication verifying system according to claim 39, wherein said encrypted data is encrypted data obtained by encrypting the information consisting of said non-duplicable information, which is based on using a plurality of wavelengths obtained by chance, for identifying said object and identification information for said object.

42. An authentication verifying system according to claim 39, wherein said encrypted data is encrypted data obtained by encrypting the information consisting of said non-duplicable information, which is based on using a plurality of wavelengths obtained by chance, for identifying said object and an electronic watermark.

43. An authentication verifying system according to claim 39, 40, 41 or 42, wherein said encrypted data is encrypted by using a common-key of a common-key cryptosystem under the control of an issuer of said object.

44. An authentication verifying system according to claim 39, 40, 41 or 42, wherein said encrypted data is encrypted by using a public-key in a public-key cryptosystem under the control of an issuer of said object.

45. An authentication verifying system according to claim 39, 40, 41 or 42, wherein said encrypted data is encrypted by using a secret-key of a public-key cryptosystem under the control of an issuer of said object.

* * * * *